(12) United States Patent
Thiele et al.

(10) Patent No.: US 10,770,940 B2
(45) Date of Patent: Sep. 8, 2020

(54) MODULAR ROTORS FOR AXIAL FLUX ELECTRIC MACHINES

(71) Applicant: Regal Beloit Australia, PTY., Ltd., Rowville (AU)

(72) Inventors: Mark Thiele, Cape Woolamai (AU); Greg Heins, Rowville (AU); Matthew J. Turner, Rowville (AU); Dean James Patterson, Murwillumbah (AU)

(73) Assignee: Regal Beloit Australia Pty Ltd., Rowville (AU)

( * ) Notice: Subject to any disclaimer, the term of this patent is extended or adjusted under 35 U.S.C. 154(b) by 148 days.

(21) Appl. No.: 15/420,953

(22) Filed: Jan. 31, 2017

(65) Prior Publication Data

US 2018/0219441 A1   Aug. 2, 2018

(51) Int. Cl.
*H02K 1/27* (2006.01)
*H02K 1/14* (2006.01)
*H02K 1/18* (2006.01)

(52) U.S. Cl.
CPC ............ *H02K 1/2793* (2013.01); *H02K 1/14* (2013.01); *H02K 1/143* (2013.01); *H02K 1/146* (2013.01); *H02K 1/148* (2013.01); *H02K 1/182* (2013.01)

(58) Field of Classification Search
CPC ..... H02K 1/2793; H02K 1/14; H02K 2201/15
USPC ........................................ 310/156.32, 156.37
See application file for complete search history.

(56) References Cited

U.S. PATENT DOCUMENTS

| | | |
|---|---|---|
| 5,691,683 A | 11/1997 | Allwine, Jr. et al. |
| 5,977,684 A | 11/1999 | Lin |
| 6,335,582 B1 | 1/2002 | Abukawa et al. |
| 6,441,522 B1 | 8/2002 | Scott et al. |
| 6,873,066 B2 | 3/2005 | Yamamoto et al. |
| 7,307,366 B2 | 12/2007 | Ionel et al. |
| 8,283,831 B1 | 10/2012 | Kaminsky et al. |
| 8,575,871 B1 | 11/2013 | Moore |
| 9,331,528 B2 | 5/2016 | Heins et al. |
| 2003/0193264 A1 | 10/2003 | Pyntikov et al. |

(Continued)

FOREIGN PATENT DOCUMENTS

| | | |
|---|---|---|
| CN | 105762950 A | 7/2016 |
| DE | 102009009894 A1 | 10/2010 |

(Continued)

OTHER PUBLICATIONS

A. G. Jack, B. C. Mecrow, G. Nord, and P. G. Dickinson, "Axial Flux Motors Using Compacted Insulated Iron Powder and Laminations—Design and Test Results," in IEEE International Conference on Electric Machines and Drives, 2005, pp. 378-385.

(Continued)

*Primary Examiner* — Michael Andrews
(74) *Attorney, Agent, or Firm* — Armstrong Teasdale LLP

(57) ABSTRACT

A rotor module for an axial flux electric machine includes a back iron segment configured for attachment to a rotor base and a plurality of permanent magnets attached to the back iron segment. The back iron segment has a length less than a circumference of the rotor base. Each permanent magnet attached to the back iron segment has an opposite magnetic pole orientation from each adjacent permanent magnet attached to the back iron segment. A plurality of rotor modules is coupled to the rotor base to form a rotor for the axial flux electric machine.

20 Claims, 27 Drawing Sheets

(56) References Cited

U.S. PATENT DOCUMENTS

| | | |
|---|---|---|
| 2004/0194286 A1 | 10/2004 | Rose |
| 2004/0200057 A1 | 10/2004 | Maslov et al. |
| 2006/0131986 A1 | 6/2006 | Hsu et al. |
| 2008/0048531 A1* | 2/2008 | Chan .................. H02K 7/1846 310/67 R |
| 2009/0230811 A1 | 9/2009 | Asano |
| 2009/0273252 A1 | 11/2009 | Nakamasu et al. |
| 2010/0071971 A1 | 3/2010 | Tatematsu et al. |
| 2010/0164316 A1* | 7/2010 | Langford .............. H02K 15/03 310/156.29 |
| 2010/0225195 A1* | 9/2010 | Asano .................. H02K 21/24 310/216.067 |
| 2011/0025161 A1 | 2/2011 | Ashe et al. |
| 2011/0080065 A1* | 4/2011 | Watanabe ............ H02K 1/2793 310/156.32 |
| 2011/0083467 A1 | 4/2011 | Asano et al. |
| 2011/0101818 A1 | 5/2011 | Lokhandwalla et al. |
| 2012/0104880 A1 | 5/2012 | Takemoto et al. |
| 2012/0146448 A1 | 6/2012 | Moghaddam et al. |
| 2013/0009508 A1 | 1/2013 | Takamatsu et al. |
| 2013/0057105 A1 | 3/2013 | Patterson et al. |
| 2013/0147291 A1 | 6/2013 | Woolmer et al. |
| 2013/0249328 A1 | 9/2013 | Dokonal et al. |
| 2014/0009023 A1 | 1/2014 | Yamamura et al. |
| 2014/0035422 A1 | 2/2014 | Mikami et al. |
| 2014/0042868 A1* | 2/2014 | Sullivan ................. H02K 1/278 310/261.1 |
| 2014/0265653 A1 | 9/2014 | Heins et al. |
| 2014/0265700 A1 | 9/2014 | Patterson et al. |
| 2015/0048696 A1 | 2/2015 | Kobler et al. |
| 2015/0048708 A1 | 2/2015 | Nord et al. |
| 2015/0244219 A1 | 8/2015 | Woolmer |

FOREIGN PATENT DOCUMENTS

| | | |
|---|---|---|
| JP | 2010259251 A | 11/2010 |
| WO | 2008003987 A2 | 1/2008 |
| WO | 2011119574 A1 | 9/2011 |
| WO | 2013144284 A2 | 10/2013 |

OTHER PUBLICATIONS

E. Spooner, A. C. Williamson, and G. Catto, "Modular design of permanent-magnet generators for wind turbines," IEEE Proceedings—Electric Power Applications, vol. 143, No. 5, pp. 388-395, Sep. 1996.

T. Husain, Y. Sozer, I. Husain, and E. Muljadi, "Design of a modular E-Core flux concentrating axial flux machine," in IEEE Energy Conversion Congress and Exposition (ECCE), 2015, pp. 5203-5210.

Gui-Jia Su, J. W. McKeever and K. S. Samons, "Modular PM motor drives for automotive traction applications," Industrial Electronics Society, 2001. IECON '01. The 27th Annual Conference of the IEEE, Denver, CO, 2001, pp. 119-124.

F. Caricchi, F. Crescimbini and O. Honrati, "Modular axial-flux permanent-magnet motor for ship propulsion drives," in IEEE Transactions on Energy Conversion, vol. 14, No. 3, pp. 673-679, Sep. 1999.

A. Jack, "Advances in Electric Machines: Topology, Materials and Construction", University of Newcastle upon Tyne, pp. 1-52.

"Somaloy® Axial Flux Machine solutions", Höganäs AB (publ), Apr. 2016, pp. 1-4.

* cited by examiner

MODULAR ROTORS FOR AXIAL FLUX ELECTRIC MACHINES

BACKGROUND

The field of the disclosure relates generally to axial flux electric machines, and more specifically, modular rotor assemblies for axial flux electric machines.

One of many applications for an electric motor is to operate a pump or a blower. The electric motor may be configured to rotate an impeller within a pump or blower, which displaces a fluid, causing a fluid flow. Many gas burning appliances include an electric motor, for example, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance.

A common motor used in such systems is an alternating current (AC) induction motor. Typically, the AC induction motor is a radial flux motor, where the flux extends radially from the axis of rotation. Another type of motor that may be used in the application described above is an electronically commutated motor (ECM). ECMs may include, but are not limited to, brushless direct current (BLDC) motors, permanent magnet alternating current (PMAC) motors, and variable reluctance motors. Typically, these motors provide higher electrical efficiency than an AC induction motor. Some ECMs have an axial flux configuration in which the flux in the air gap extends in a direction parallel to the axis of rotation of the rotor.

At least some known axial flux motors include a rotor with a plurality of permanent magnets and a stator with an annular back iron. The back iron includes a plurality of magnetic teeth formed on the back iron having electrically conductive windings disposed thereon. Unlike radial flux motors in which the rotor is positioned within the stator (or vice versa), the rotor and stator are positioned adjacent each other in a face-to-face configuration. The electromagnetic teeth are annularly disposed around the stator and extend axially towards the permanent magnets from a back iron that couples the teeth to each other. However, these known axial flux motors typically require customized components and costly equipment to manufacture motors with different operating characteristics (e.g., motor size, torque, speed, number of poles, etc.). In addition, maintenance on the components of these motors may be difficult to perform without replacing the entire rotor or stator.

BRIEF DESCRIPTION

In one aspect, a rotor module for an axial flux electric machine includes a back iron segment configured for attachment to a rotor base and a plurality of permanent magnets attached to the back iron segment. The back iron segment has a length less than a circumference of the rotor base. Each permanent magnet attached to the back iron segment has an opposite magnetic pole orientation from each adjacent permanent magnet attached to the back iron segment.

In another aspect, a rotor for an axial flux electric machine includes a rotor base having a face surface and a circumference around the face surface, and at least one rotor module attached the rotor base. The rotor module includes a back iron segment and a plurality of permanent magnets attached to the back iron segment. The back iron segment is attached to the face of the rotor base and has a length less than a circumference of the rotor base. Each permanent magnet attached to the back iron segment has an opposite magnetic pole from each adjacent permanent magnet attached to the back iron segment.

In yet another aspect, an axial flux electric machine including a stator and a rotor positioned adjacent the stator. The rotor includes a rotor base having a face surface and a circumference around the face surface, and at least one rotor module attached the rotor base. The rotor module includes a back iron segment and a plurality of permanent magnets attached to the back iron segment. The back iron segment is attached to the face surface of the rotor base and has a length less than a circumference of the rotor base. Each permanent magnet attached to the back iron segment has an opposite magnetic pole from each adjacent permanent magnet attached to the back iron segment.

DETAILED DESCRIPTION

The systems and methods described herein relate generally to axial flux electric machines, and more specifically, to modular assemblies for axial flux electric machines. As used herein, an "axial flux electric machine" is a motor or generator that uses axial flux to generate a power output (mechanical power output for the motor and electrical power output for the generator).

Figure 1:
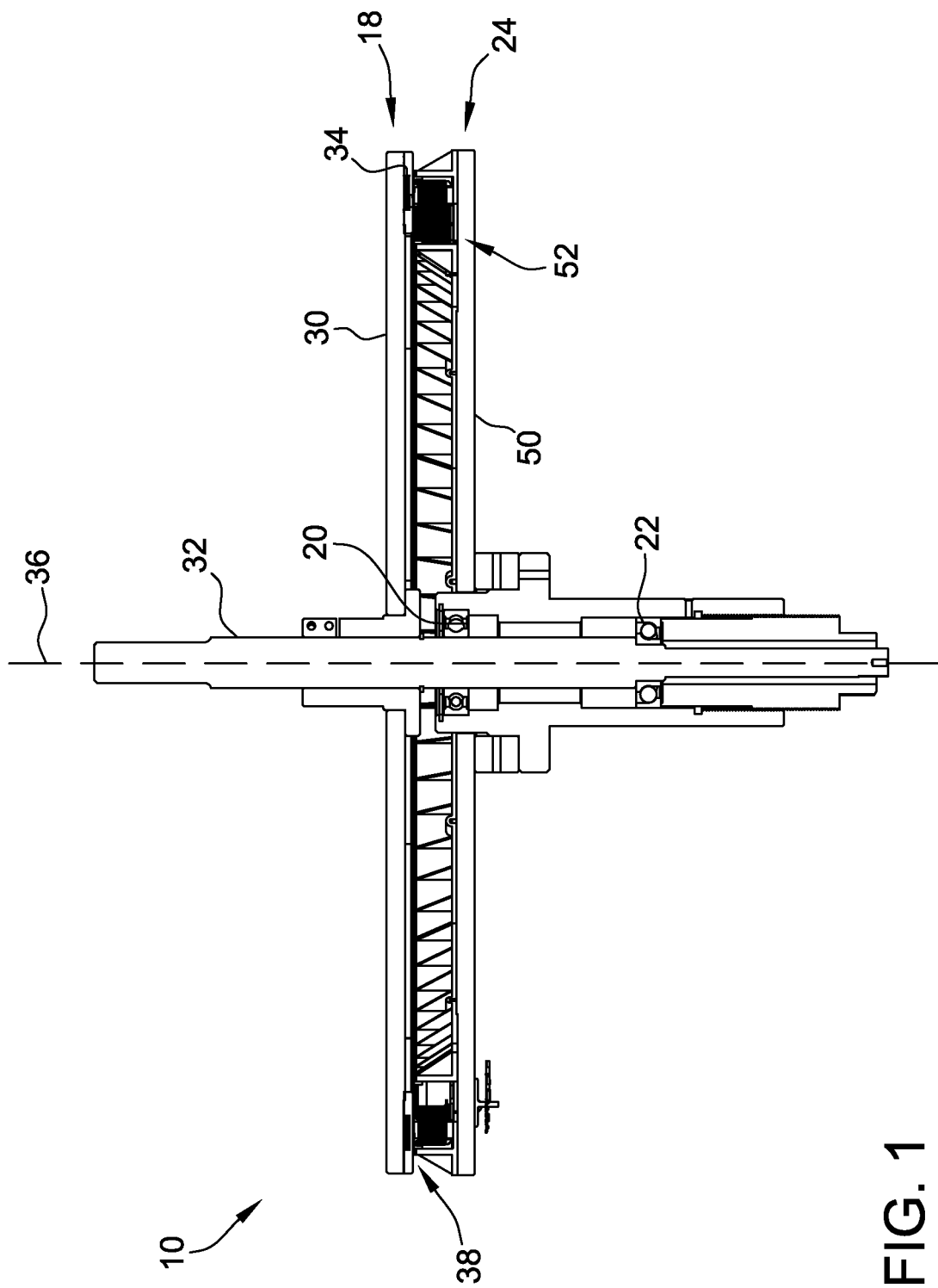
FIG. 1 is a cross-sectional view of an exemplary axial flux electric machine.
Figure 2:
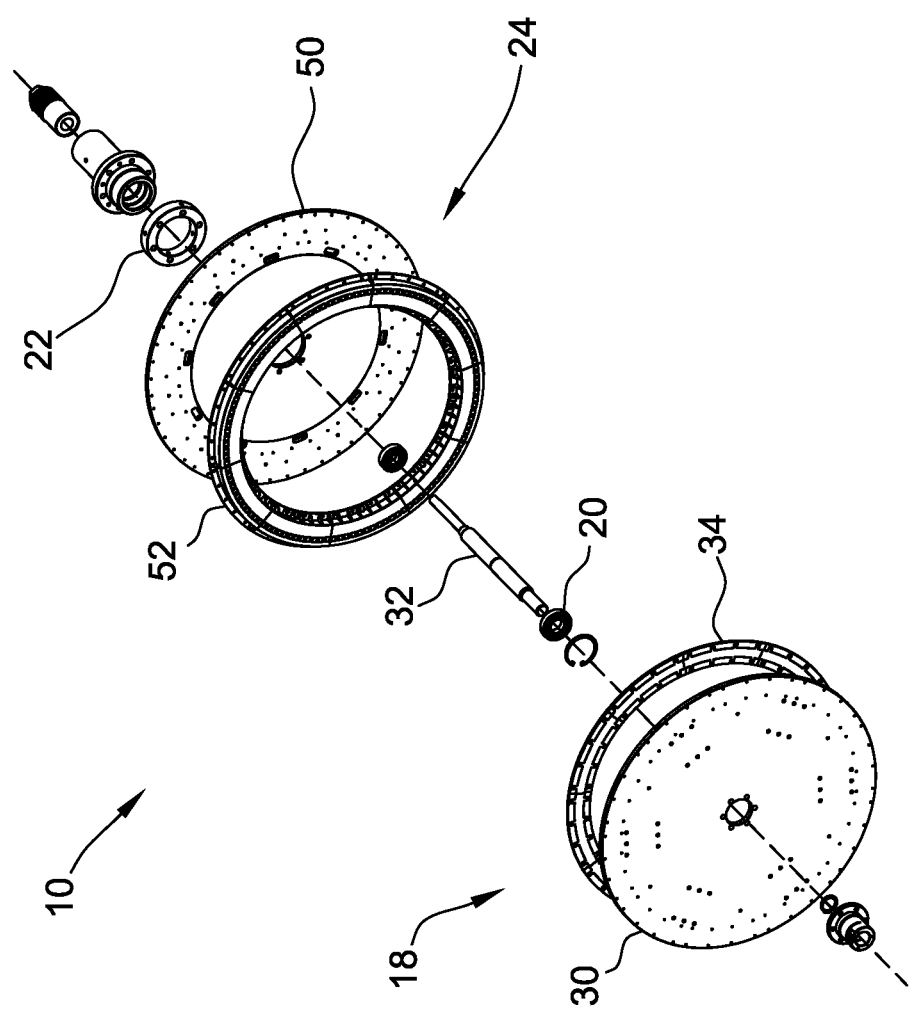
FIG. 2 is an exploded view of the axial flux electric machine shown in FIG. 1.

FIG. 1 is a cross-sectional view of an exemplary axial flux electric machine 10. FIG. 2 is an exploded view of axial flux electric machine 10. In the example embodiment, electric machine 10 is an electric motor. Alternatively, electric machine 10 may operate as an electric generator. In comparison to radial flux electric machines, axial flux electric machine 10 has a relatively small axial length. Axial flux electric machine 10 generally includes a rotor 18, a first bearing assembly 20, a second bearing assembly 22, and a stator 24.

In the exemplary embodiment, rotor 18 generally includes a rotor base 30 coupled to a shaft 32. A plurality of rotor modules 34 are coupled to rotor base 30. As described in detail further herein, each rotor module 34 includes one or more permanent magnets (not shown in FIG. 1). Rotor assembly 18 is rotatable within housing 16, and more specifically, rotatable within first bearing assembly 20 and second bearing assembly 22 about an axis of rotation 36. In the exemplary embodiment, rotor 18 is driven by an electronic control (not shown), for example, a sinusoidal or trapezoidal electronic control.

Stator 24 includes a stator base 50 and at least one stator module pack 52 that is configured to generate axial flux towards rotor modules 34. An air gap 38 is formed between a rotor outer surface and a stator outer surface, and a magnetic flux within machine 10 extends between rotor modules 34 and stator 24 in a direction parallel to axis 36.

Figure 3:
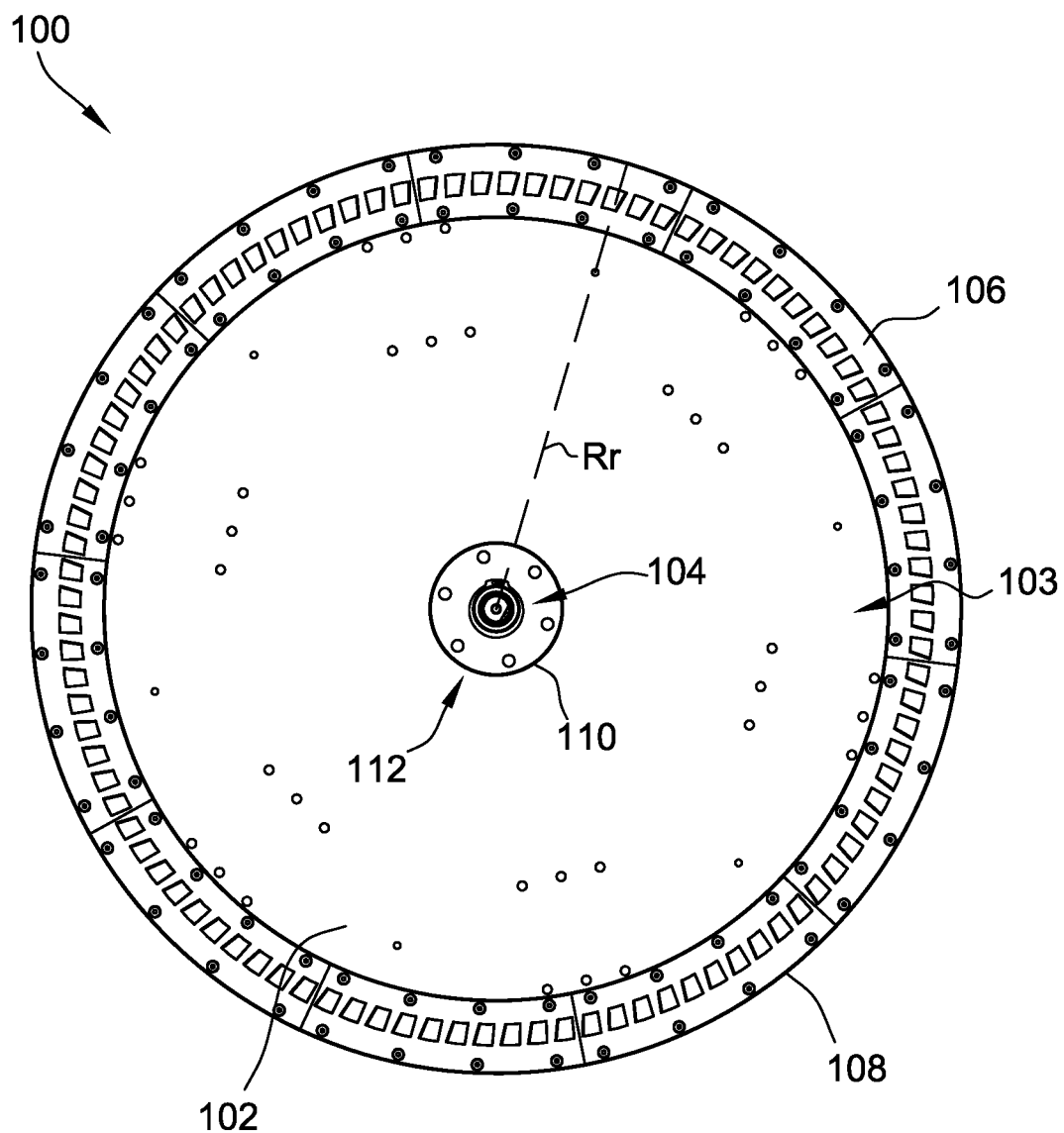
FIG. 3 is a top plan view of an exemplary rotor that may be used with the axial flux electric machine shown in FIG. 1.

FIG. 3 is a perspective view of an example rotor 100 that may be used with the axial flux electric machine 10 shown in FIG. 1. Rotor 100 includes a rotor base 102, a shaft 104, and a plurality of rotor modules 106 attached to rotor base 102. In other embodiments, rotor 100 includes additional, fewer, or alternative components, including those described elsewhere herein.

In the example embodiment, rotor base 102 is a circular disk having a circumferential outer edge 108 and an inner edge 110. In other embodiments, rotor base 102 has a different shape. Rotor base 102 has an outer radius $R_r$ and an outer circumference. In the example embodiment, rotor base 102 may be fabricated from a non-magnetic material, such as plastic, aluminum, and stainless steel. In other embodiments, rotor base 102 is at least partially fabricated from a magnetic material. Shaft 104 extends through an opening 112 defined by inner edge 110. Shaft 104 may be configured to rotate with rotor base 102 to generate mechanical (motor) or electrical (generator) power. Alternatively, shaft 104 may be configured to be stationary such that rotor 100 generates power without movement of shaft 104. Rotor base 102 is configured to rotate in response to magnetic forces associated with rotor modules 106 as described herein.

Rotor modules 106 are disposed on a face surface 103 of rotor base 102 such that rotor modules 106 are substantially aligned with stator module packs (e.g., packs 52, shown in FIG. 1) on an adjacent stator. In the example embodiment, ten rotor modules 106 are circumferentially attached to rotor base 102 proximate outer edge 108 on face surface 103. In other embodiments, a different number of rotor modules 106 (including one) are attached to rotor base 102. Although rotor modules 106 are shown in a single row on rotor base 102, it is to be understood that rotor modules 106 may be attached to rotor base in multiple rows that are radially spaced and/or circumferentially spaced from each other. In certain embodiments, rotor modules 106 are disposed on face surface 103 in a non-uniform configuration (i.e., spacing varies between at least some adjacent rotor modules 106). In at least some embodiments, rotor base 102 and/or rotor modules 106 include one or more slots, fasteners, tabs, openings, hooks, and other components to facilitate secure attachment of rotor modules 106 to rotor base 102. In the exemplary embodiment, rotor modules 106 include fastener openings 107 (shown in FIG. 4B) that are configured to align with a corresponding hole (not shown) on rotor base 102 and receive a fastener, such as a screw or bolt, to secure rotor modules 106 to rotor base 102. Adjacent rotor modules 106 define an arc that is similar to an arc defined by outer edge 108. In other embodiments, rotor modules 106 are attached to rotor base 102 in other suitable configurations.

Figure 4A:
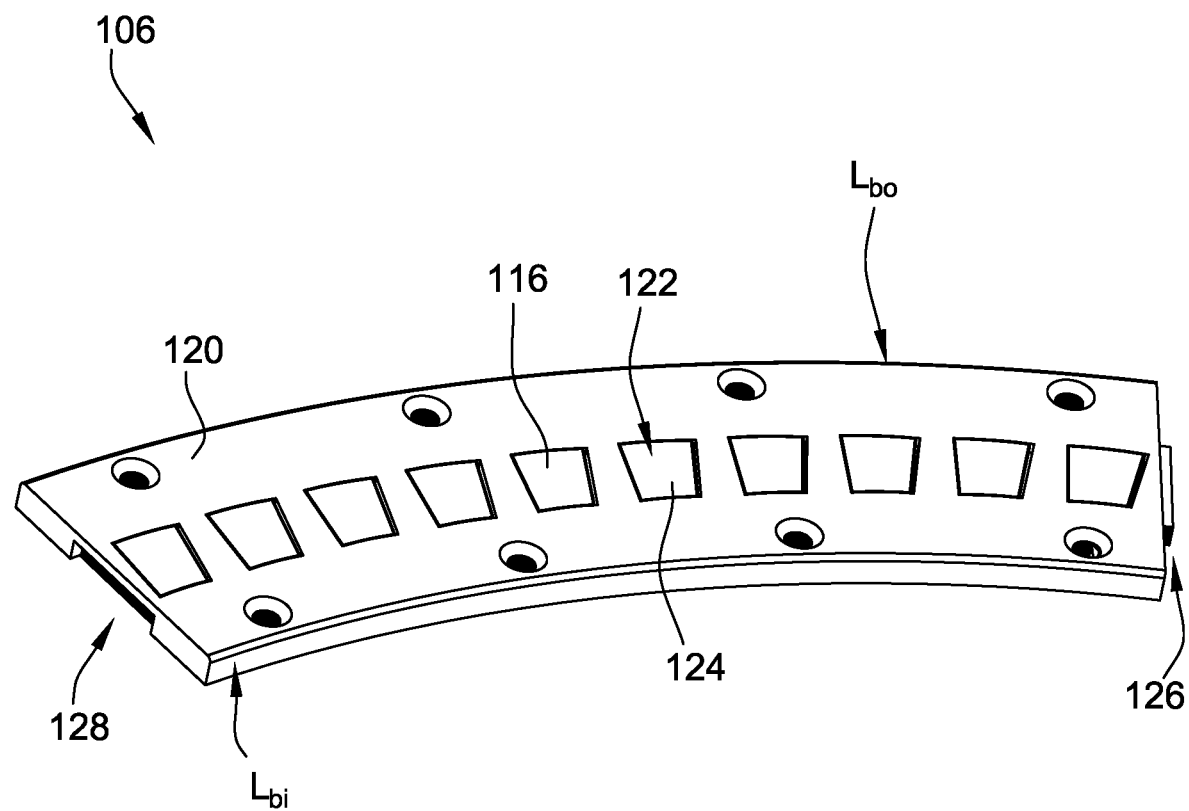
FIG. 4A is a perspective view of an exemplary rotor module that may be used with the rotor shown in FIG. 3.
Figure 4B:
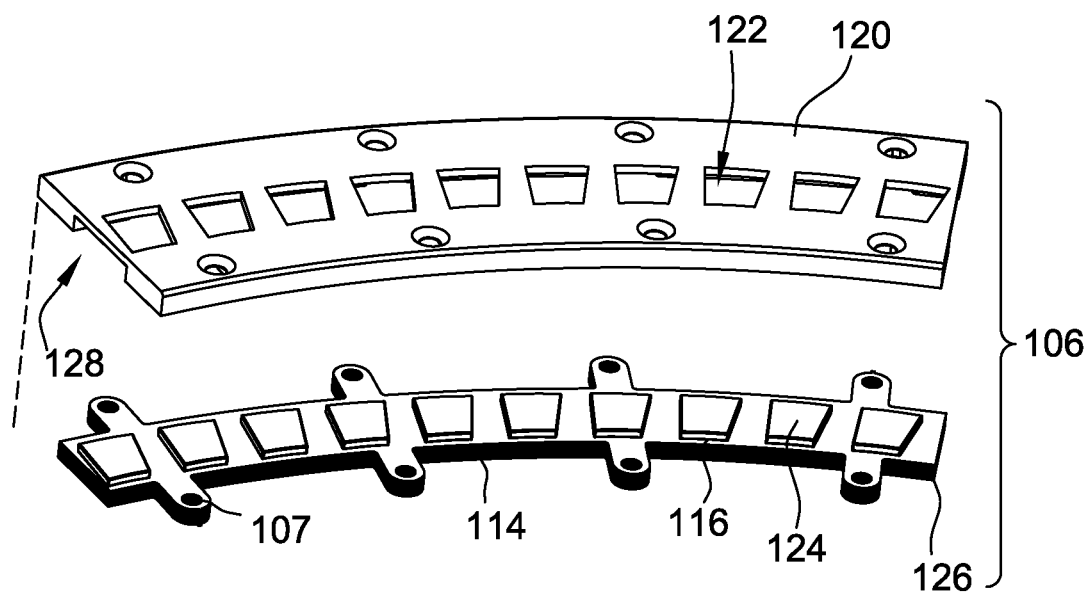
FIG. 4B is an exploded view of the exemplary rotor module shown in FIG. 4A.

FIG. 4A is a perspective view of an example rotor module 106 and FIG. 4B is an exploded view of the example rotor module 106 that may be used with rotor 100 shown in FIG. 3. FIGS. 4A and 4B are collectively referred to herein as FIG. 4. Each rotor module 106 includes a back iron segment 114 (shown in FIG. 4B) configured to attach to rotor base 102 and a plurality of permanent magnets 116 attached to back iron segment 114. In the exemplary embodiment, back iron segment 114 includes openings 107 that are configured to receive a fastener to secure rotor module 106 to stator base 102. Back iron segment 114 is fabricated from a magnetic material to provide a flux path between magnets 116. The magnetic material may include, but is not limited to, laminated steel, soft magnetic composite (SMC), ferromagnetic steel, and combinations thereof.

Rotor module 106 has an inner arcuate length $L_{bi}$ and an outer arcuate length $L_{bo}$. The outer length $L_{bo}$ is less than the circumference of rotor base 102 such that multiple rotor modules 106 can be attached to a single rotor base 102. The lengths $L_{bi}$ and $L_{bo}$ are defined by the radius $R_r$ of rotor base 102 and an arc angle of rotor module 106. In some embodiments, rotor module 106 may be substantially straight such that lengths $L_{bi}$ and $L_{bo}$ are substantially linear. Attaching multiple straight modules 106 around rotor base 102 at different angles enables modules 106 to approximate an arc around rotor base 102. The curvature or arc angle of rotor module 106 is defined by the radius $R_r$ of rotor base 102. Alternatively, the radius $R_r$ is determined based on the number of rotor modules 106 and the curvature of rotor modules 106. In other embodiments, the arc angle of rotor module 106 is dependent upon a different feature or design parameter of machine 10 (shown in FIG. 1).

Magnets 116 are attached to back iron segment 114 in a configuration where they are spaced from each other. In other embodiments, magnets 116 may be combined together as one or more magnets with a plurality of poles. Magnets 116 are secured to back iron segment 114 using any suitable connection means, such as adhesive, clamps, friction-fit, and other suitable means. In the example embodiment, back iron segment 114 includes ten magnets 116. In other embodiments, back iron segment 114 includes any suitable number of magnets 116, and in particular, any even number of magnets 116. Adjacent magnets 116 have opposite polarities for forming flux paths between magnets 116. With magnets 116 of opposite polarities and a magnetic back iron segment 114, adjacent rotor modules 106 may be electromagnetically separate from each other (i.e., no flux paths are provided between adjacent rotor modules 106) and still operate. That is, each rotor module 106 is configured to provide a complete magnet path between a first magnet 116, back iron segment 114, and a second magnet 116 having a polarity opposite the polarity of the first magnet 116. In one embodiment, rotor 100 includes the same number of magnets 116 as the number of windings and/or teeth of an adjacent stator (not shown in FIG. 3). In the exemplary embodiment, permanent magnets 116 are fabricated from neodymium and are formed in a trapezoid-shape. However, any suitable permanent magnet shape and material may be used that enables electric machine 10 to function as described herein.

In the example embodiment, each rotor module 106 further includes a magnet retainer 120. In other embodiments, rotor modules 106 do not include magnet retainer 120. Magnet retainer 120 is fabricated from a non-magnetic material (e.g., plastic). In at least some embodiments, magnet retainer 120 is fabricated from a non-conductive material. Magnet retainer 120 is coupled to rotor base 102 and/or back iron segment 114 such that magnet retainer 120 extends axially towards an adjacent stator. In the example embodiment, magnet retainer 120 includes slots 122 that are aligned with magnets 116 such that a face surface 124 of magnets 116 is exposed. In some embodiments, during assembly of rotor module 106, magnet retainer 120 is coupled to back iron segment 114 prior to installing magnets 116. In such embodiments, slots 122 are configured to facilitate aligning magnets 116 on back iron segment 114. In other embodiments, slots 122 are sized and/or shaped to prevent magnets 116 from moving in the axial direction towards the stator and to secure magnets 116 to back iron segment 114.

In the exemplary embodiment, back iron segment 114 includes a tab 126 extending beyond magnet retainer 120 and an opening 128. In at least some embodiments, tab 126 and opening 128 are formed by positioning back iron segment 114 out of alignment with respect to guard 120. That is, tab 126 is a portion of back iron segment 114 and opening 128 is defined by guard 120 and the absence of back iron segment 114. Tab 126 is configured to be inserted into opening 128 of an adjacent rotor module 106 to secure adjacent rotor modules 106 together. In some embodiments, tab 126 and/or opening 128 include hooks, slots for fasteners, and/or other features to facilitate coupling adjacent rotor modules 106 together. In other embodiments, back iron segment 114 does not include tab 126 or opening 128. For example, if the length $L_b$ of rotor module 106 is substantially straight, guard 120 may not include tab 126 and opening 128 due to the angled positions of adjacent rotor modules 106. Alternatively, adjacent rotor modules 106 may be physically separate from one another.

Rotor modules 106 are configured to enable a user to design, assemble, and maintain a customized axial flux electric machine. That is, rotor modules 106 may be mass-produced with various curvatures, number of magnets, and the like. When the user designs an electric machine, the user determines a size and shape of the stator as described herein. Based on the determined size and shape of the stator, the user determines the size of rotor base 102. Rotor base 102 may have a substantially similar size and shape as the stator. Alternatively, rotor base 102 may have a different suitable size and shape. Rotor modules 106 are then attached to rotor base 102 to define or approximate an arc similar to the arc defined by the stator modules of the stator to facilitate a flux path between the stator and rotor 100.

During operation, magnetic forces cause magnetic flux to flow from permanent magnets 116 to the closest stator module (not shown in FIGS. 3 and 4). When magnets 116 are not aligned with a stator module, a portion of the available flux may be lost (i.e., the stator module does not capture all of the available flux). Generally, the more effectively that available flux that is channeled from permanent magnets 116 and captured by the stator modules, the more efficient machine 10 operates. Therefore, it is desirable to cause as much flux as possible to be captured by the stator modules. However, because the plurality of permanent magnets 116 are rotating above the stator, magnets 116 are not always positioned directly over the stator modules to provide for a straight flow path of flux from magnets 116 to the modules.

In some known electric machines, the flux changes magnitude within the body of the magnets to reach the stator modules. The change in flux magnitude creates eddy currents, which may cause heat generation and torque losses, potentially resulting in a reduction in operating efficiency of the machine. Additionally, the heat produced by the eddy currents may cause demagnetization of the magnets and/or failure of an adhesive used to retain the magnets within the rotor, which may cause the magnets to disengage from the rotor, resulting in failure of the machine. Furthermore, in some known machines, some flux may not be channeled to the stator and may leak to a different part of the rotor or the stator. Such leakage may not only cause a reduction in torque generation, thereby making the machine potentially less efficient, but also may cause an undesirable dynamic force distribution inside the machine that may lead to increased noise production and vibration.

In at least some embodiments, rotor 100 includes a flux guide (not shown in FIGS. 3 and 4) for one or more magnets 116 to facilitate reduced eddy currents, noise, and vibrations. The flux guide (also sometimes referred to as a "magnet shim" or a "magnet tip") is positioned on magnet 116 such that the flux guide is between magnet 116 and an adjacent stator. In some embodiments, the flux guide is secured to magnet 116 (e.g., using an adhesive). In the example embodiment, the flux guides are manufactured from an isotropic SMC material, such as Somaloy® (available from Höganäs AB of Höganäs, Sweden). In other embodiments, the flux guides are manufactured from a different magnetic material. In the exemplary embodiment, the flux guides have a thickness of approximately 2 millimeters. Alternatively, the flux guides may have any thickness that enables machine 10 to function as described herein. An air gap (e.g., air gap 38, shown in FIG. 1) is defined between the flux guide and the stator.

The flux guide has a shape and a size that enables the flux guide to at least partially cover face surface 124 of magnet 116. In the example embodiment, the flux guide is configured to extend beyond the majority of the edges of surface 124 of magnet 116 to which it is attached to direct flux from magnets 116 to the stator and back. For example, the flux guides may have a width and a length that extends beyond a corresponding width and length of magnet 116. This overhang facilitates additional degree(s) of freedom when optimizing noise, cost, and efficiency of rotor 100 and the configuration of magnets 116. The shape of the flux guide is any suitable shape to enable machine 10 to function as described herein. In one example, the shape of the flux guide is substantially similar to the shape of magnet 116. In another example, the shape of the flux guide is different from the shape of magnet 116. As used herein with respect to flux guides, a "different shape" in comparison to a first shape may include another geometrical shape (e.g., cylinder, cube, etc.) different from the first shape or the same geometrical shape as the first shape but with different lengths, widths, arcs, angles, and so forth. For example, if the flux guide and magnet 116 are both trapezoids having different arc angles, the flux guide and magnet have different shapes. In certain embodiments, rotor 100 may include at least two different shaped or sized flux guides to function as described herein.

In some embodiments, the adjacent flux guides define an arc substantially similar to the arc defined by rotor modules 106. For example, if rotor modules 106 have a substantially straight length $L_b$ and are attached to rotor base 102 at different angles to approximate an arc around rotor base 102, the flux guides may be coupled to rotor modules 106 to define a substantially uniform annular arc around rotor base 102. In certain embodiments, each flux guide is positioned on more than one magnet 116 and extends to or beyond the edges of surface 124 for each magnet 116 to which it is attached.

During operation of machine 10, the flux generated by magnet 116 is channeled to one or more stator modules by a respective flux guide. When magnet 116 is not aligned with a stator module, the flux guide steers or channels portions of the flux from magnet 116 to nearby stator modules. By channeling flux to the stator modules through the flux guides to reduce the change in flux magnitude within magnets 116, the formation of eddy currents within magnets 116 is substantially reduced or otherwise eliminated.

Substantially all of the flux generated by magnets 116 is channeled to and captured by the stator modules, resulting in higher torque production and more efficient operation of machine 10. Additionally, the flux guides facilitate reducing the leakage of flux to components of machine 10 other than the stator modules because substantially all of the flux is captured by the stator modules. The reduction of flux leakage reduces the dynamic force distribution within machine 10 and, therefore, reduces the generation of endemic noise and vibrations. Furthermore, the reduction or elimination of eddy currents within magnets 116 reduces the amount of heat generated by machine 10, which results in higher efficiency and facilitates retention of magnets 116 within rotor 100.

In at least some embodiments, the flux guides are extended beyond the edges of magnets 116 to provide a potential leakage path for flux. The leakage path is insignificant for small air gaps between the flux guide and a stator module (i.e., when the stator module is directly aligned with the flux guide), but increases the rate of flux reduction into a particular stator module as the air gap increases.

Figure 5:
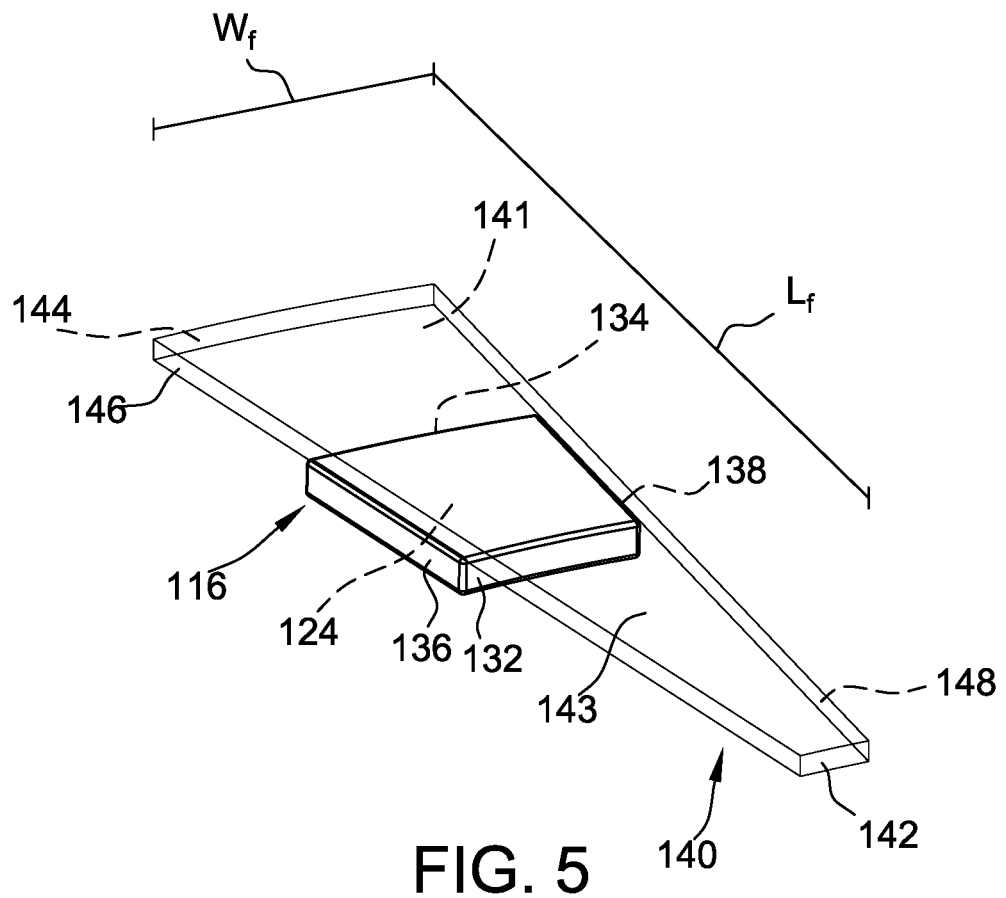
FIG. 5 is a perspective view of an exemplary flux guide with an extended length that may be used with the rotor shown in FIG. 3.
Figure 6:
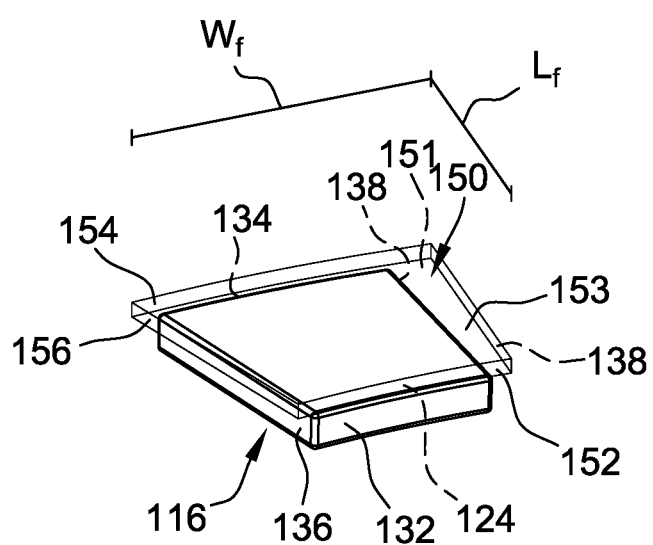
FIG. 6 is a perspective view of an exemplary flux guide with an extended width that may be used with the rotor shown in FIG. 3.
Figure 7:
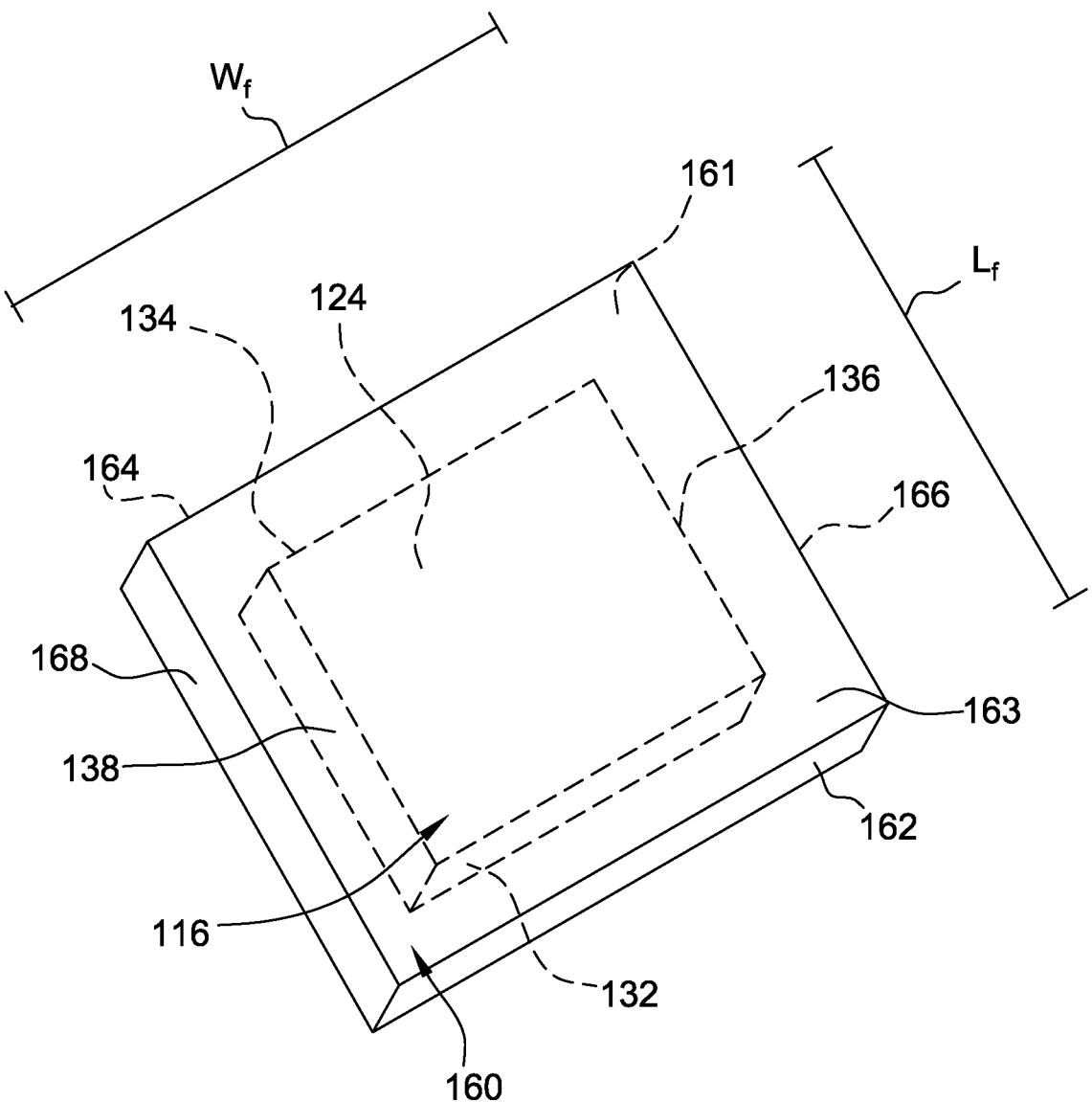
FIG. 7 is a perspective view of an exemplary flux guide with an extended length and width that may be used with the rotor shown in FIG. 3.
Figure 8:
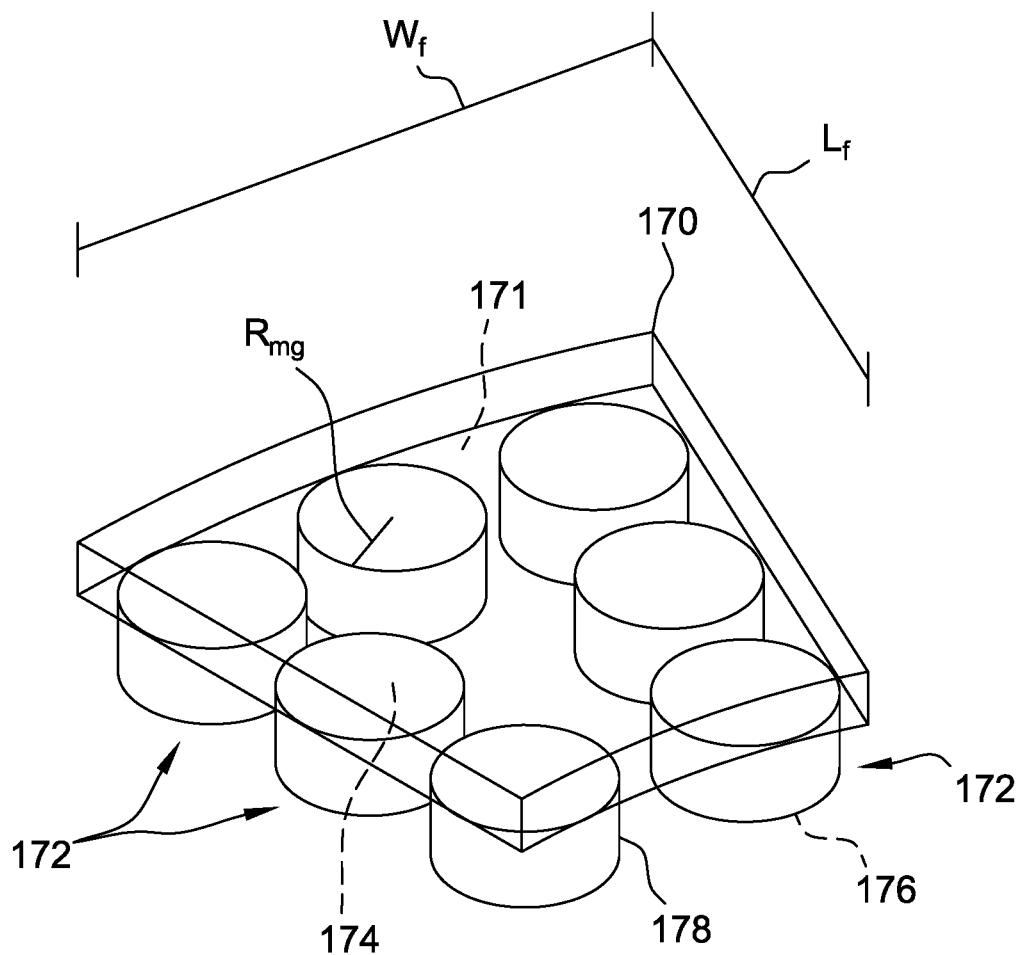
FIG. 8 is a perspective view of an exemplary flux guide for a plurality of permanent magnets that may be used with the rotor shown in FIG. 3.

FIGS. 5-8 are perspective views of some example flux guide configurations that may be used with rotor 100 shown in FIG. 3. In particular, FIG. 5 is a perspective view of a first flux guide 140 having an extended length $L_f$, FIG. 6 is a perspective view of a second flux guide 150 having an extended width $W_f$, FIG. 7 is a perspective view of a third flux guide 160 having an extended length $L_f$ and width $W_f$, and FIG. 8 is a perspective view of a fourth flux guide 170 positioned on a plurality of permanent magnets 172. Flux guides 140, 150, 160, and 170 are shown for descriptive purposes only, and are not meant to limit the configuration of flux guides as described herein.

With respect to FIGS. 5-7, each flux guide 140, 150, and 160 is positioned on a respective magnet 116. In particular, flux guides 140, 150, and 160 are positioned on face surface 124 of magnet 116. In the exemplary embodiments, flux guides 140, 150, and 160 have an arcuate trapezoidal shape similar to the shape of magnet 116. In another embodiment, magnets 116 are shaped as a portion or section of an annulus defined by all of magnets 116. In other embodiments, flux guides 140, 150, and 160 have a different shape and are not required to be the same shape as magnet 116. Magnet 116 has an arcuate inner edge 132, an arcuate outer edge 134, a first side edge 136, and an opposing second side edge 138. Face surface 124 is defined by edges 132, 134, 136, and 138. Arcuate inner edge 132 has an arc length less than the arc length of outer edge 134 such that face surface 124 tapers inwardly. In the exemplary embodiment, when rotor 100 is assembled, inner edge 132 of magnet 116 is positioned towards inner edge 110 of rotor base 102 and outer edge 134 of magnet 116 is positioned towards outer edge 108 of rotor base 102 (each shown in FIG. 3). Side edges 136 and 138 are positioned towards adjacent magnets 116 on rotor 100.

With respect to FIG. 5, flux guide 140 includes a magnet surface 141, an arcuate inner edge 142, a gap surface 143, an arcuate outer edge 144, a first side edge 146, and a second side edge 148. Magnet surface 141 is positioned adjacent face surface 124 of magnet 116. Gap surface 143 is oriented towards a stator (not shown in FIG. 5) during operation. Inner edge 142 is smaller than outer edge 144 such that magnet surface 141 and gap surface 143 taper inwardly. The arc length of inner edge 142 is less than the arc length of outer edge 144. Flux guide 140 has a maximum width $W_f$ defined between first and second side edges 146 and 148 that is substantially similar to a width of magnet 116. The length $L_f$ of flux guide 140 is defined between inner edge 142 and outer edge 144 and extends beyond inner and outer edges 132 and 134 of magnet 116 such that flux guide 130 covers the entirety of face surface 124. In some embodiments, flux guide 140 may extend beyond only one of inner edge 132 and outer edge 134 of magnet 116. In at least some embodiments, flux guide 140 is tapered such that an air gap (e.g., air gap 38, shown in FIG. 1) between flux guide 140 and a stator tooth at inner edge 142 is different from an air gap at outer edge 144. The tapered air gap facilitates balancing flux entering an inner edge and an outer edge of a stator tooth to prevent flux from flowing perpendicular to the laminations of the stator tooth.

With respect to FIG. 6, flux guide 150 includes a magnet surface 151, an arcuate inner edge 152, a gap surface 153, an arcuate outer edge 154, a first side edge 156, and a second side edge 158. Flux guide 150 and magnet 116 have different arc angles. Magnet surface 151 is positioned adjacent face surface 124 of magnet 116. Gap surface 153 is oriented towards a stator (not shown in FIG. 6) during operation. Flux guide 150 has a length $L_f$ defined between inner and outer edges 152 and 154 that is substantially similar to a length of magnet 116. The maximum width $W_f$ of flux guide 150 is defined between first and second side edges 156 and 158 and extends beyond first and second side edges 136 and 138 of magnet 116 such that flux guide 130 covers the entirety of face surface 124. In some embodiments, flux guide 150 may extend beyond only one of first side edge 136 and second side edge 138 of magnet 116. In at least some embodiments, flux guide 150 is tapered between inner edge 152 and outer edge 154 to provide a different size air gaps at each edge 152, 154.

With respect to FIG. 7, flux guide 160 includes a magnet surface 161, an inner edge 162, an air gap surface 163, an outer edge 164, a first side edge 166, and a second side edge 168. Magnet surface 161 is positioned adjacent to face surface 124 of magnet 116. Air gap surface 163 is oriented towards a stator (not shown in FIG. 7) during operation. Flux guide 160 has a length $L_f$ defined between inner and outer edges 162 and 164 and a width $W_f$ defined between first and second side edges 166 and 168. The length $L_f$ and width $W_f$ of flux guide 160 extends beyond the length and width of magnet 116 to cover the entirety of face surface 124. In at least some embodiments, flux guide 160 is tapered between inner edge 162 and outer edge 164 to provide a different size air gaps at each edge 162, 164.

With respect to FIG. 8, flux guide 170 is similar to flux guides 140, 150, and 160 and includes similar components. Flux guide 170 is positioned on a plurality of cylindrical magnets 172. Magnets 172 have a face surface 174 that is adjacent to magnet surface 171 of flux guide 170, a back iron surface 176, an edge portion 178 and a radius $R_{mg}$ that is less than the length $L_f$ and width $W_f$ of flux guide 170. Edge portion 178 extends between face surface 174 and back iron surface 176. Magnets 172 only have a single edge portion 178 because of their cylindrical shape. However, in other embodiments, magnets 172 may have a plurality of edge portions if magnets 172 have a different shape, such as a rectangle or a trapezoid. Although magnets 172 are shown having uniform shapes and sizes, it is to be understood that any suitable combinations of shapes and sizes can be used for magnets 172. Irrespective of the size and shape of magnets 172, flux guide 170 is configured to cover face surface 174 of each and every magnet 172. In at least some embodiments, flux guide 170 is configured to extend beyond magnets 172 in at least one direction.

Figure 9:
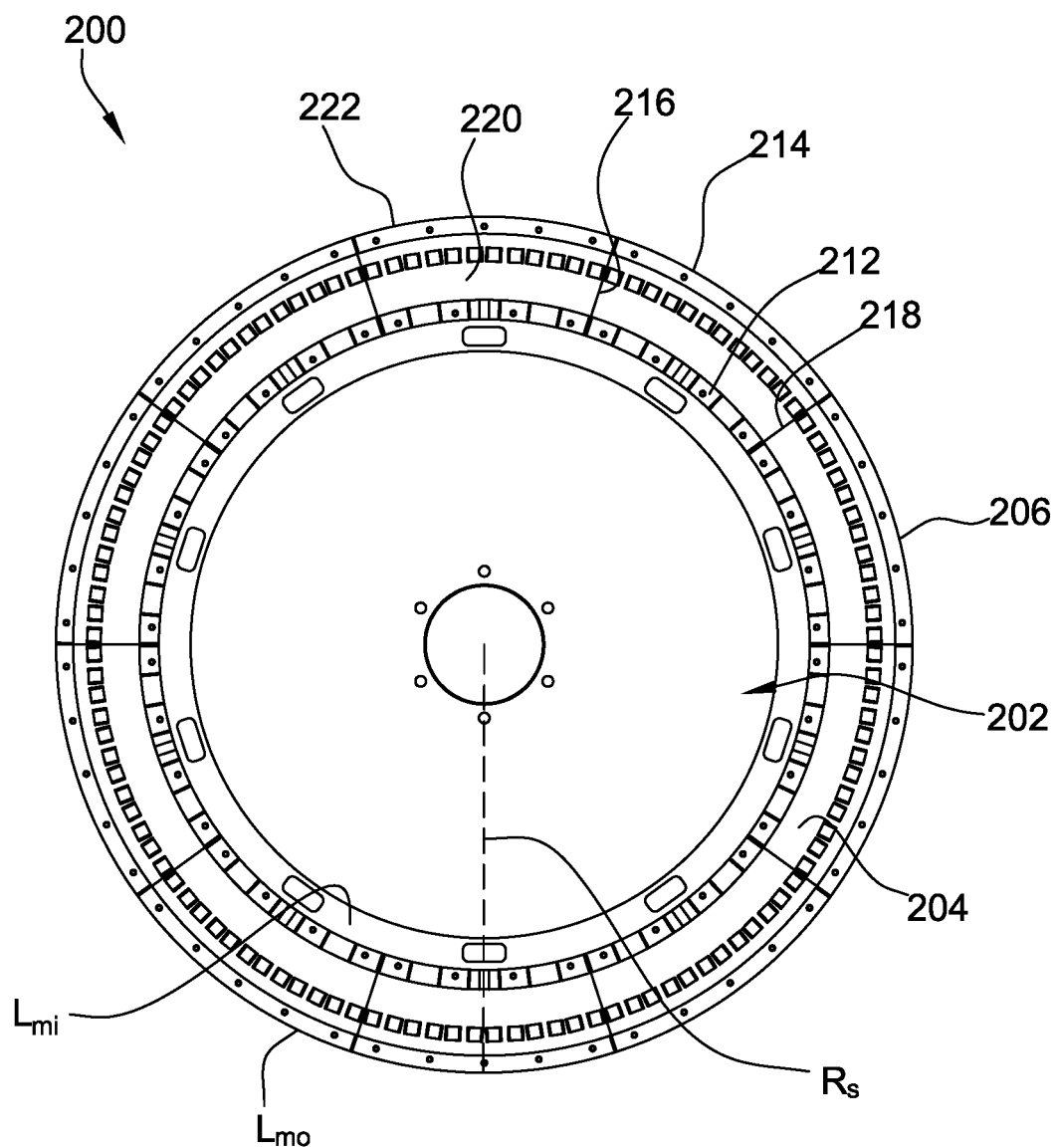
FIG. 9 is a top plan view of an example stator with curved stator module packs that may be used with the axial flux electric machine shown in FIG. 1.
Figure 10:
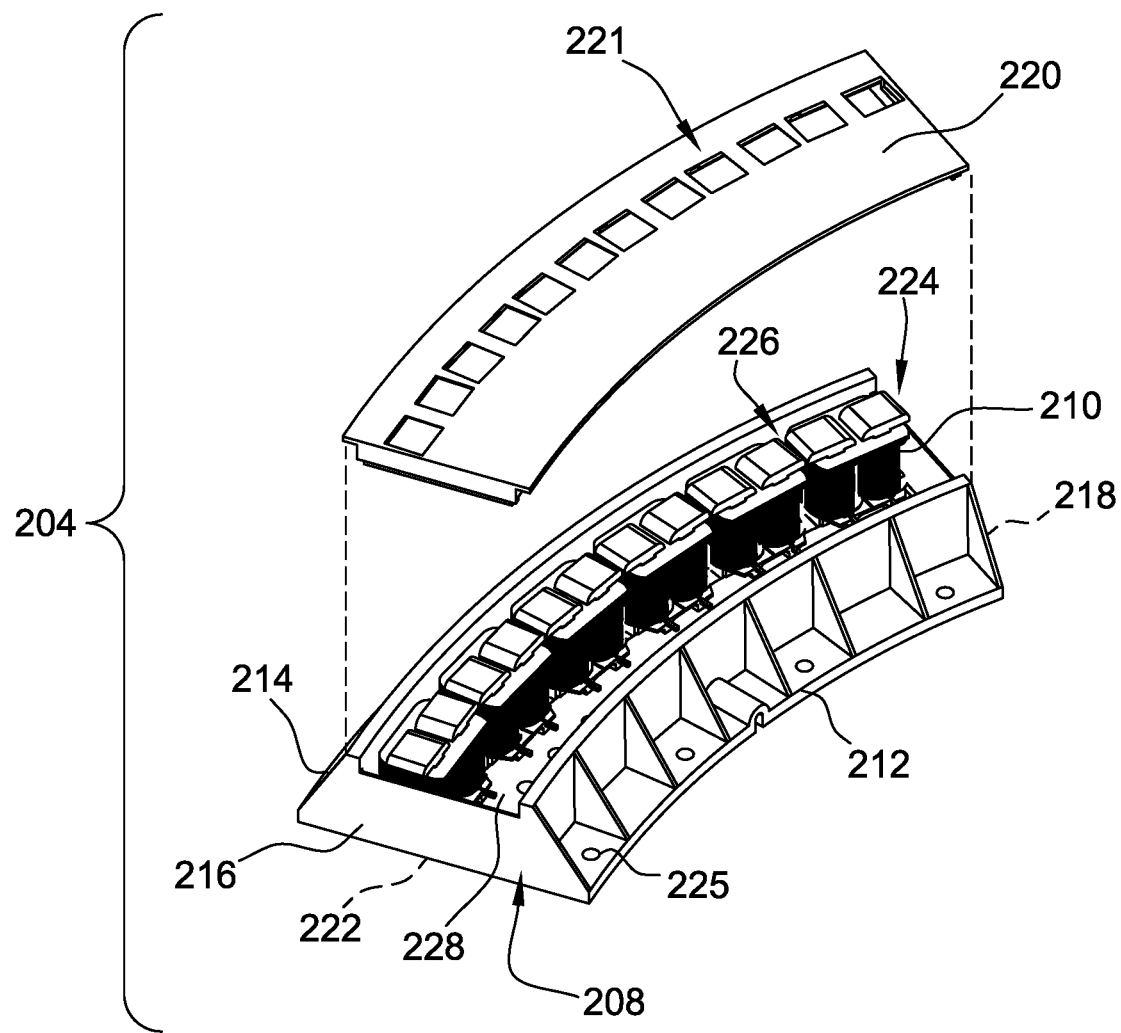
FIG. 10 is a perspective view of an exemplary stator module pack that may be used with the stator shown in FIG. 8.

FIG. 9 is a top plan view of an example stator 200 that may be used with the axial flux electric machine 10 shown in FIG. 1. Stator 200 may be a multiphase stator (e.g., three phases) or a single phase stator that produces flux in the axial direction (i.e., parallel to axis of rotation 36 shown in FIG. 1). Stator 200 includes a stator base 202 and a plurality of stator module packs 204 attached to stator base 202. In other embodiments, stator 200 includes additional, fewer, or alternative components, including those described elsewhere herein. FIG. 10 is a partial exploded view of a curved stator module pack 204.

With respect to FIGS. 9 and 10, stator base 202 has a circular shape and includes an outer edge 206 that defines a circumference and a radius $R_s$ of base 202. In other embodiments, stator base 202 may be a different shape or size. The shape and/or size of stator base 202 may be determined based on an intended use of the axial flux machine with stator 200 and/or the number of stator module packs to be installed on stator base 202. In the example embodiment, stator base 202 is fabricated from a material or combination of materials having a suitable rigidity and strength to support stator module packs 204. In some embodiments, stator base 202 is a non-magnetic material or combination of materials, such as a plastic or non-magnetic metal. Alternatively, stator base 202 may be fabricated from a magnetic material. Stator base 202 may include or more mounting points (not shown) for coupling stator module packs 204, stator drivers (not shown in FIG. 8), and/or a rotor to stator base 202. In the exemplary embodiment, stator module packs 204 are evenly distributed around stator base 202 in a complete, uniform annulus configuration. In other embodiments, stator module packs 204 may be connected to stator base 202 in a non-uniform configuration (i.e., spacing varies between at least some adjacent stator module packs 204).

Stator module packs 204 include a housing 208 and one or more stator modules 210 attached to housing 208. Housing 208 includes an inner radial wall 212, an outer radial wall 214, a first end wall 216, a second end wall 218, a face surface 220, and a base surface 222. When stator 200 is assembled, face surface 220 is oriented to face the rotor and base surface 222 is oriented towards stator base 202. The walls and surfaces of housing 208 define an enclosed volume 224 for stator modules 210. In FIG. 10, face surface 220 is removed from housing 208 to view the interior of volume 224. In some embodiments, face surface 220 includes a plurality of teeth openings 221 that are aligned with stator modules 210 to facilitate transmission of axial flux to the rotor. In other embodiments, face surface 220 does not include teeth openings 221. Housing 208 has an inner arcuate length $L_{mi}$ extending along inner radial wall 212, an outer arcuate length $L_{mo}$ extending along outer radial wall 214, and a width $W_m$ extending from inner radial wall 212 to outer radial wall 214. The inner length $L_{mi}$ is less than the outer length $L_{mo}$. Although housing 208 is shown as having arcuate lengths and $L_{mo}$, in some embodiments, housing 208 may be substantially straight to facilitate attaching stator module packs 204 around different stators having different circumferences of stator base 202. In such embodiments, inner and outer lengths $L_{mi}$ and $L_{mo}$ may be substantially similar to each other. In other embodiments, housing 208 has a different shape to facilitate positioning stator modules 210 in a different configuration. For example, although stator modules 210 are shown in a single arc, in some embodiments, housing 208 is configured to facilitate two-dimensional configurations of stator modules 210 and/or radial configurations.

In the example embodiment, housing 208 is a rigid material to provide protection to stator modules 210 (not shown in FIG. 9). In other embodiments, housing 208 is at least partially flexible to enable stator module pack 204 to be adjusted to a particular curvature or shape, and thus enabling stator module packs 204 to be used for various configurations of stator 200. For example, inner radial wall 212, outer radial wall 214, face surface 220, and base surface 222 may include flexible joints and rigid segments to facilitate adjustment of stator module pack 204. Alternatively, stator module packs 204 may be formed with a rigid housing 208 having a predetermined arc angle or curvature.

Housing 208 includes one or more mounting points 225 that align with a corresponding mounting point on stator base 202. Mounting points 225 are configured to receive a fastener (e.g., screw, bolt, dowel, clamp, etc.) to secure stator module packs 204 to stator base 202. Additionally or alternatively, housing 208 includes one or more tabs, slots, latches, adhesive, and/or other component that engages stator base 202 to secure stator module packs 204 to stator base 202.

In the example embodiment, stator module packs 204 are annularly attached to stator base 202 adjacent to each other and outer edge 206. In some embodiments, at least a portion of stator module packs 204 are separated from one or more adjacent packs 204 to define a pack gap (not shown) between adjacent packs 204. The pack gap may be any size, including less than inner arcuate length $L_{mi}$ of housing 208 and greater than outer arcuate length $L_{mo}$ of housing 208. Alternatively, adjacent stator module packs 204 contact each other after assembly of stator 200. Stator module packs 204 are curved to define an arc that aligns with outer edge 206 of stator base 202. In other embodiments, housings 208 have arcuate lengths $L_{72i}$ and that are defined by the radius $R_s$ and an arc angle such that the curvature of housings 208 aligns with the curvature of outer edge 206. Alternatively, stator module packs 204 may be attached to stator base 202 in a different configuration. In one example, stator module packs 204 are radially attached to stator base 202.

In the example embodiment, each stator module pack 204 includes six stator modules 210. In other embodiments, stator module pack 204 may include a different number of stator modules 210 (including one). In one example, each stator module pack 204 includes three stator modules 210. In another example, stator 200 includes one or more stator modules 210 with a different number of stator modules 210. Stator modules 210 are positioned adjacent to each other within housing 208 such that a module gap 226 is defined between each adjacent stator module 210. Stator modules 210 are positioned in a single line along the length $L_m$ of housing 208. In the example embodiment, stator modules 210 are positioned in a single, substantially straight line between the inner and outer arcuate lengths $L_{mi}$ and $L_{mo}$ of housing 208 within volume 224. In other embodiments, stator modules 210 are positioned in a different configuration within volume 224. Alternatively, stator module packs 204 may not include modules 210. Rather, in such embodiments, stator module packs 204 include a single portion of a stator core (not shown) that has a plurality of stator teeth.

In the example embodiment, stator modules 210 are attached to a circuit board 228 that extends along a portion of housing 208 within volume 224. Circuit board 228 is configured to mechanically secure modules 210 together and to electrically couple each module 210 to one or more inputs and outputs (e.g., power input, drive signals, etc.). In some embodiments, circuit board 228 electrically couples at least a portion of modules 210 together. Alternatively, circuit board 228 may electrically isolate each module 210 from each another.

Figure 11:
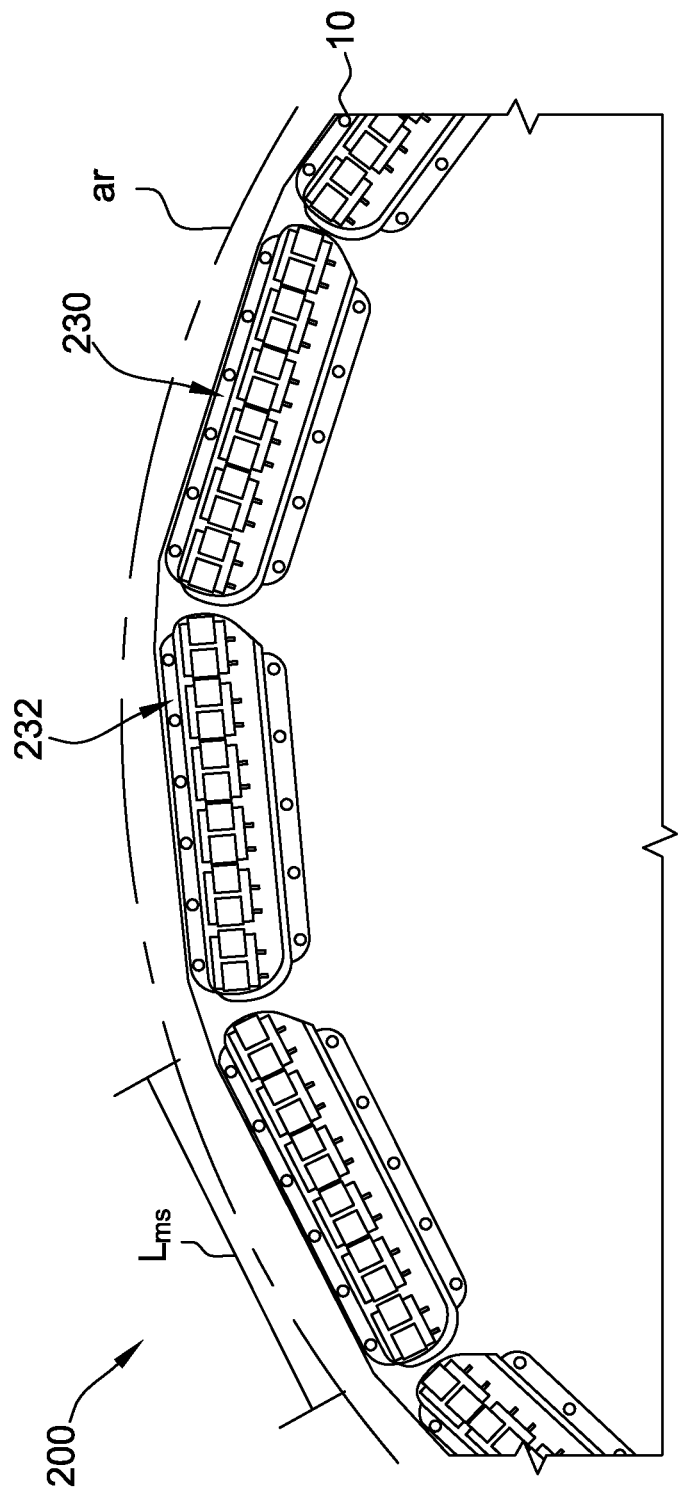
FIG. 11 is a partial top plan view of an exemplary stator with straight module packs that may be used with the axial flux electric machine shown in FIG. 1.
Figure 12:
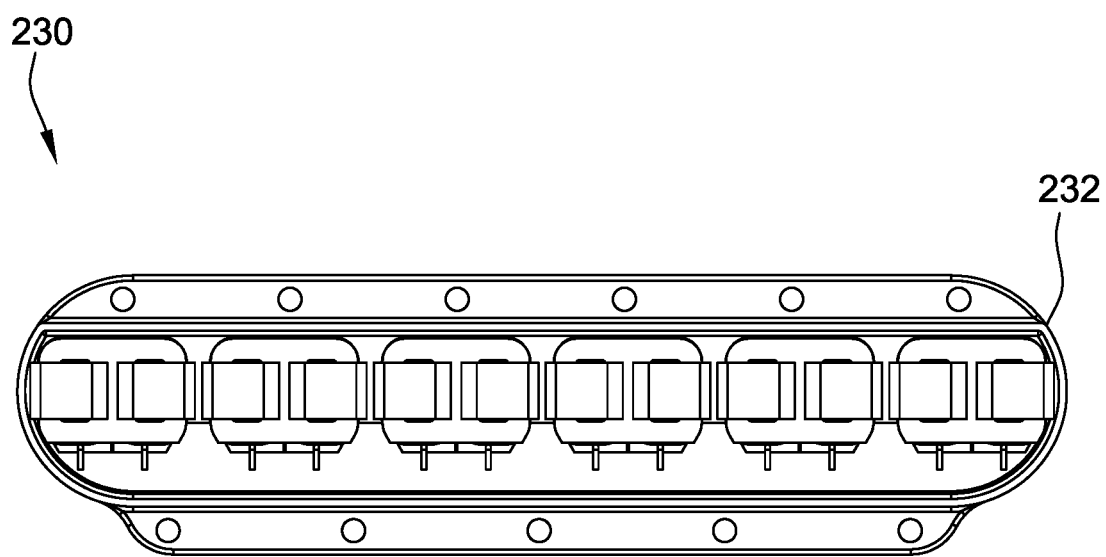
FIG. 12 is a top plan view of an exemplary straight stator module pack that may be used with the stator shown in FIG. 11.

FIG. 11 is a partial plan view of an exemplary stator 200 with straight stator module packs 230. FIG. 12 is a top plan view of the exemplary straight stator module pack 230. Stator module pack 230 is similar to stator module pack 204 and, in the absence of contrary representation, includes similar components.

With respect to FIGS. 11 and 12, each stator module pack 230 includes a housing 232 with a substantially straight length $L_{ms}$. A face surface (not shown) of housing 232 is removed for clarity purposes. Stator module packs 230 are coupled to stator base 202 at different angles to form a group of linear packs 230 that approximate an arc a, matching or similar to an arc defined by the radius $R_s$ and outer edge 206 (i.e., the circumference). As the number of packs 230 increases, the angle between adjacent packs 230 decreases such that the arc a, substantially matches the arc defined by the radius $R_s$ and outer edge 206. The straight module packs 230 enable a user to install stator module packs 230 on a variety of stator bases 202 having different sizes and shapes, thereby increasing the flexibility and modularity of the user's design options for an axial flux electric machine.

With respect again to FIGS. 9 and 10, each stator module pack 204 is electrically coupled to one or more electric drive units (not shown in FIGS. 9 and 10). As used herein, "electrically coupled" components do not require electricity or current to actually be present between the components, but are coupled such that when current is present, the current is transferred between the electrically coupled components. The electric drive units are coupled to a power source and include one or more drive circuits. The drive circuits include, for example, inverters, rectifiers, transformers, and the like that facilitate control of the performance of machine 10 (shown in FIG. 1). In some embodiments, the electric drive units are in communication with a controller (not shown). In other embodiments, the electric drive units include an integrated controller. The electric drive units are configured to generate a drive signal to stator module pack 204 to cause axial flux to be generated, thereby facilitating movement of an adjacent rotor. The drive signal for at least some stator modules 210 are synchronized together to increase the torque, speed, and/or efficiency of the rotor. The drive signal may be mono-phase or multi-phase. In one example, three electric drive units operate together to generate a three-phase drive signal. In another example, one electric drive unit generates a three-phase drive signal.

In some embodiments, one or more electric drive units are electrically coupled to each and every stator module pack 204 on stator 200. In other embodiments, one or more electric drive units are electrically coupled to a subset of stator module packs 204 (i.e., at least one pack 204) of stator 200. In such embodiments, the electric drive units are communicatively coupled to each other to facilitate synchronizing the drive signals together. In some embodiments, each stator module pack 204 is electrically coupled to a single electric drive unit. In other embodiments, each stator module pack 204 includes an electric drive unit for each phase of pack 204. For example, if pack 204 has three phases, three electric drive units are electrically coupled to each pack 204.

In some embodiments, the electric drive units are attached adjacent stator module packs 204. For example, the electric drive units may be attached to stator base 202 proximate packs 204. In other embodiments, the electric drive units are integrated within the stator modules packs 204 such that each pack 204 acts as a self-contained stator. That is, it is possible to operate machine 10 using only a single stator module pack 204. Packs 204 are electromagnetically independent of each other (i.e., each pack 204 generates and completes a flux path by itself) in at least some embodiments, and therefore may be operated without synchronizing with the other packs 204.

Figure 13:
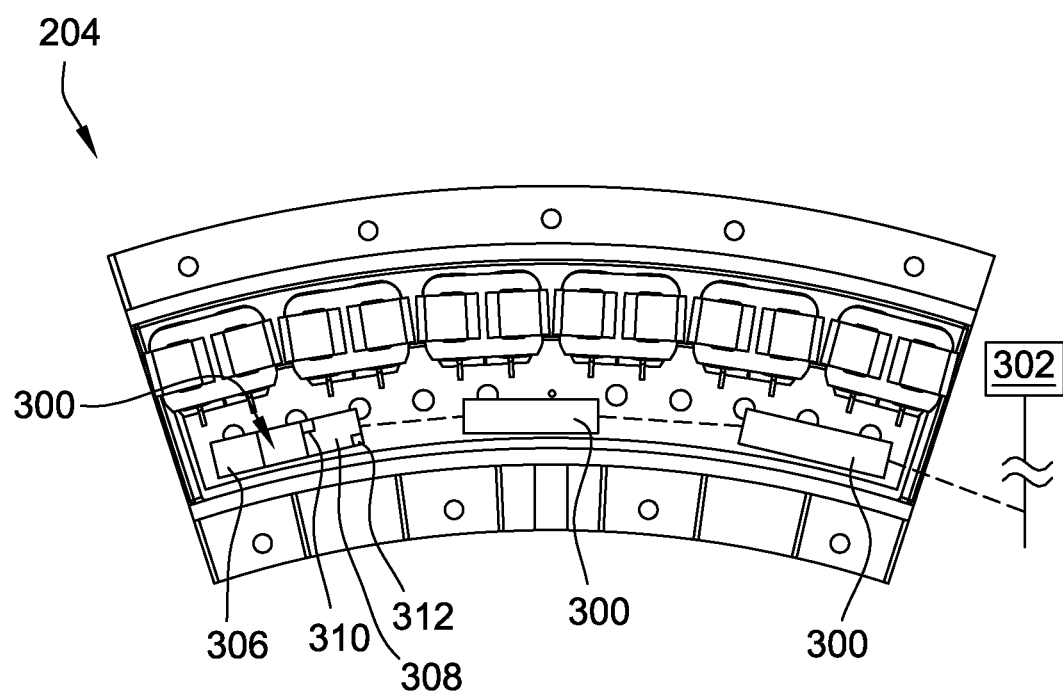
FIG. 13 is a top plan view of an exemplary stator module pack with integrated electric drive units that may be used with the stator shown in FIG. 8.

FIG. 13 is a top plan view of an example stator module pack 204 that includes a plurality of integrated electric drive units 300. Stator module pack 204 is substantially similar to pack 204 shown in FIG. 10 and includes similar components.

Drive units 300 are electrically coupled to a power input 302 and at least a portion of stator modules 210. Connections with stator modules 210 are not shown in FIG. 13 for clarity purposes. Power input 302 is power provided by an external power source (e.g., a battery or utility power grid). In certain embodiments in which machine 10 (shown in FIG. 1) is a generator, power input 302 is power generated by machine 10. Drive units 300 generate a drive signal based on power input 302 and provide the drive signal to stator modules 210. In one embodiment, the drive signal is a single phase power signal. Alternatively, the drive signal may be a multiphase power signal (e.g., three-phase power). In the example embodiment, each drive unit 300 is coupled to two respective stator modules 210 to provide a different phase of the drive signal such that a cumulative three-phase drive signal is provided to stator modules 210. That is, one electric drive unit 300 generates a drive signal having a first phase, a second drive unit 300 generates a drive signal having a second phase, and a third drive unit 300 generates a drive signal having a third phase. The drive signals cause stator modules 210 to provide flux paths for flux from a rotor (not shown in FIG. 13) and rotate the rotor.

In the example embodiment, drive units 300 includes at least a drive circuit 306 and a controller 308. In some embodiments, each drive unit 300 includes a plurality of drive circuits 306, where each drive circuit 306 is electrically coupled to a respective subset of stator modules 210. Drive circuit 306 is configured to convert at least a portion of power input 302 into the drive signal for stator modules 210. Drive circuits 306 may include an inverter and/or an alternating current-to-alternating current (AC-AC) converter depending upon the power input 302. In some embodiments, drive circuit 306 includes other suitable components (e.g., rectifiers, computer storage devices, etc.) that enable drive units 300 to perform as described herein. In some embodiments, each drive unit 300 includes a plurality of drive circuits 306, wherein each drive circuit 306 is coupled to a respective subset of stator modules 210 to provide the drive signals. In one example, drive unit 300 includes three drive circuits 306.

In the exemplary embodiment, controller 308 includes a processor 310 and a memory device 312. In the exemplary embodiment, controller 308 is integrated within electric drive unit 300. In other embodiments, controller 308 is implemented in one or more processing devices, such as a microcontroller, a microprocessor, a programmable gate array, a reduced instruction set circuit (RISC), an application specific integrated circuit (ASIC), etc. in communication with electric drive unit 300. Accordingly, in this exemplary embodiment, controller 308 is constructed of software and/or firmware embedded in one or more processing devices. In this manner, controller 308 is programmable, such that instructions, intervals, thresholds, and/or ranges, etc. may be programmed for a particular machine 10 and/or an operator of machine 10. Controller 308 may be wholly or partially provided by discrete components, external to one or more processing devices.

Controller 308 is communicatively coupled to inverter 306 to control inverter 306 and adjust the drive signal. That is, controller 308 determines the frequency and magnitude of the drive signal based on stored instructions, feedback provided from other components of machine 10, and so forth. In one example, controller 308 controls the operation of one or more switches (not shown) within inverter 306 to adjust the drive signal.

Figure 14:
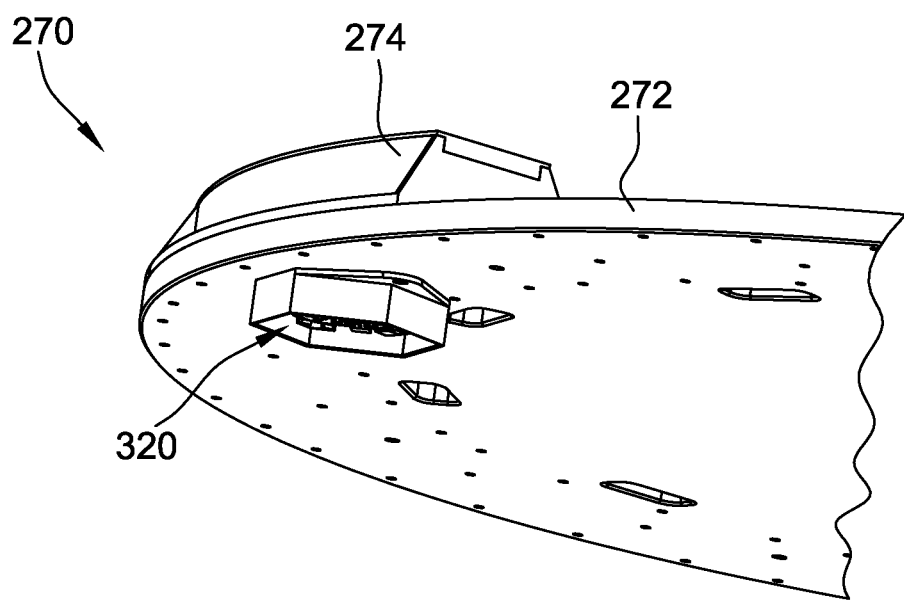
FIG. 14 is a perspective view of an exemplary stator with external electric drive unit that may be used with the electric machine shown in FIG. 1.

FIG. 14 is a partial perspective view of an exemplary stator 270 that may be used with machine 10 shown in FIG. 1. Stator 270 includes a stator base 272, a stator module pack 274, and an electric drive unit 320. Although only one stator module pack 274 and electric drive unit 320 are shown, it is to be understood that stator 270 may include a plurality of stator module packs 274 and electric drive units 320. Stator 270 is substantially similar to stator 200 (shown in FIG. 9) except electric drive units 320 are attached to stator base 272 outside of stator modules packs 274. Each drive unit 320 is electrically coupled to at least a portion of one stator module pack 274. In other embodiments, each drive unit 320 is electrically coupled to a plurality of packs 274. In the exemplary embodiment, drive units 320 are coupled to a surface of base 272 opposite a surface with stator module packs 274. In other embodiments, drive units 320 may be attached to base 272 and/or packs 274 is any suitable configuration to facilitate operation of machine 10.

Figure 15:
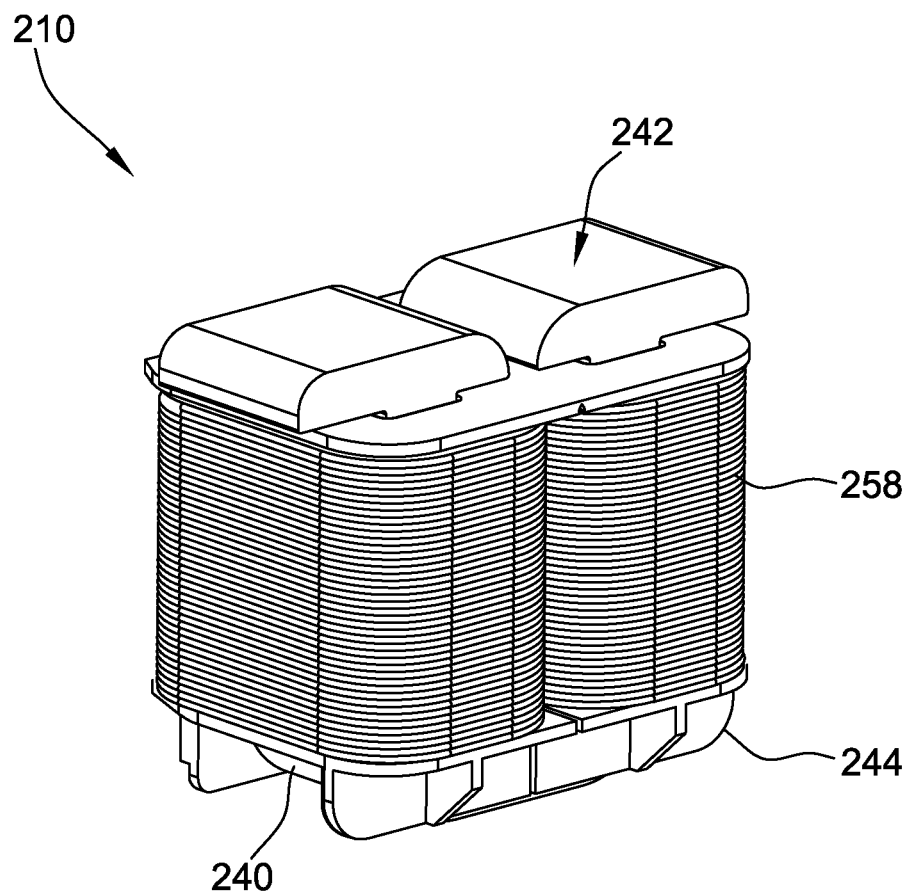
FIG. 15 is a perspective view of an example stator module that may be used with the stator module pack shown in FIG. 9.
Figure 16:
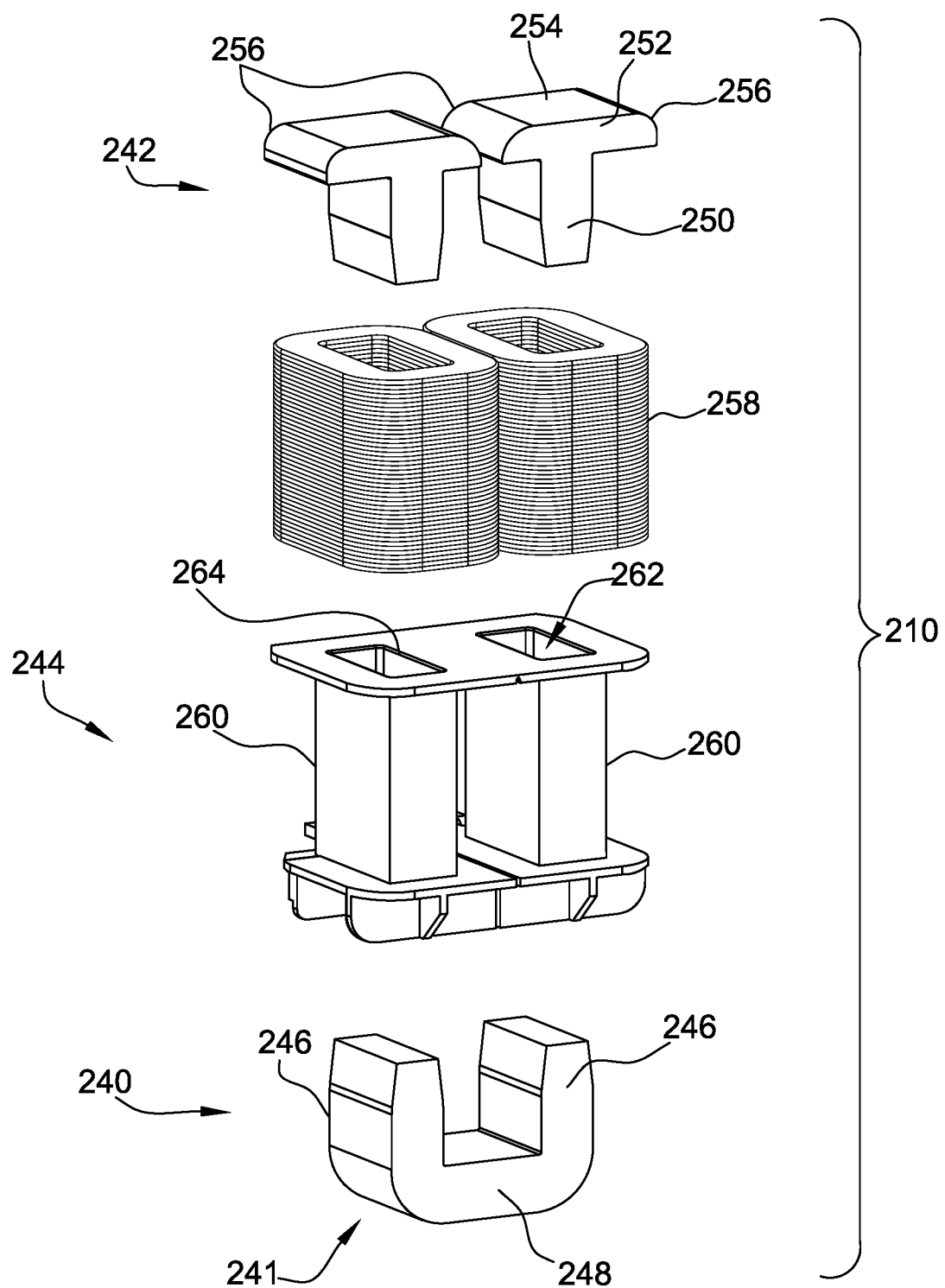
FIG. 16 is an exploded view of an example stator module that may be used with the stator module pack shown in FIG. 9.

FIG. 15 is a perspective view of an exemplary stator module 210 for use in a stator module pack (e.g., pack 204, shown in FIG. 9) and FIG. 16 is an exploded view of the exemplary module 210. Stator module 210 includes a core 240, tooth tips 242, and a bobbin assembly 244. In other embodiments, stator module 210 includes additional, fewer, or alternative components, including those described elsewhere herein.

In the exemplary embodiment, core 240 is generally U-shaped and includes a pair of teeth 246 connected by a yoke section 248. Alternatively, core 240 is a different shape, such as an E-shaped core. In the exemplary embodiment, core 240 is oriented in a generally axial direction such that teeth 246 extend substantially parallel to axis of rotation 36 (shown in FIG. 1). In the example embodiment, core 240 is fabricated from a plurality of stacked laminated sheets 241. In other embodiments, core 240 is fabricated from a different material.

In the exemplary embodiment, tooth tips 242 are generally T-shaped and include an axial member 250 and a cross member 252. Each cross member 252 includes a head surface 254 configured to receive flux from an adjacent rotor. In other embodiments, tooth tips 242 may have a different shape or configuration. In the exemplary embodiment, tooth tips 242 are fabricated from a plurality of stacked laminated sheets 243. In other embodiments, tooth tips 242 are fabricated from SMC or another magnetic material. Tooth tips 242 include rounded portions 256 to reduce noise by reducing the harmonic content of the back electromagnetic field (EMF) and cogging torque. Tooth tips 242 are generally aligned with a corresponding tooth 246 and increase flux density in stator 200 (shown in FIG. 8) and reduce the length of a winding 258 necessary for stator module 210.

Bobbin assembly 244 includes two bobbins 260. That is, bobbin assembly 244 includes the same number of bobbins 260 as teeth 246 of core 240. Alternatively, bobbin assembly 244 may include one bobbin 260 positioned on every other tooth 246, and/or one bobbin 260 positioned on yoke section 248. Bobbin 260 includes an opening 262 that closely conforms to an external shape of stator module teeth 246 and tooth tip axial member 250. For example, stator module tooth 246 is configured to be positioned at least partially within a first end (not shown) of opening 262, and tooth tip axial member 250 is configured to be positioned at least partially within a second end 264 of opening 262.

Assembling stator module 210 includes at least one winding 258 around a plurality of bobbins 260. At least a portion of each tooth 246 of core 240 is inserted into a corresponding bobbin opening 262. Tooth tips 242 are also coupled to bobbins 260. Specifically, at least a portion of axial member 250 is inserted into bobbin opening 262. Once assembled, stator module 210 is placed within a stator module pack 204 for assembly of a stator.

Using modular packs 204 enables a user to design, assemble and maintain a stator 200 according to particular specifications. That is, packs 204 enable creation of a customized axial flux electric machine without requiring expensive, custom manufacturing systems and processes. Rather, the modularity facilitates mass production of packs 204 that can be selected to design a customized motor. In addition, the modular design enables packs 204 to be replaced with relative ease for existing electric machines.

Figure 17:
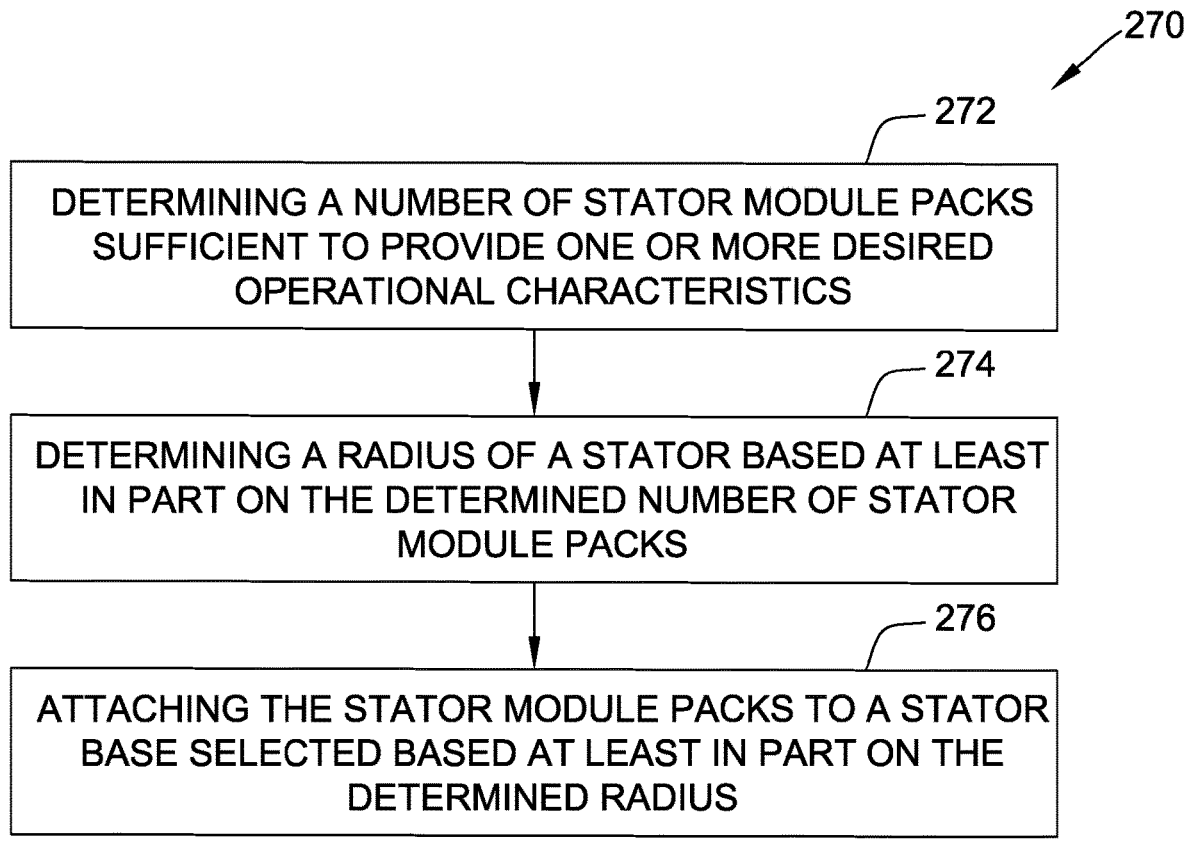
FIG. 17 is a flow diagram of an exemplary method for assembling a stator for an axial flux electric machine that may be used to assembly the machine shown in FIG. 1.

FIG. 17 is a flow diagram of an example method 270 of assembling an axial flux electric machine that may be used to assemble a machine that includes stator 200 shown in FIG. 8. In particular, the axial flux electric machine to be assembled has one or more desired operational characteristics. As used herein, operational characteristics include mechanical and/or electromagnetic properties of the electric machine, such as torque, number of phases, rotations per minute (rpm), electrical current input or output, voltage input or output, power output, and the like.

To begin, the user determines 272 a number of stator module packs sufficient to produce a stator for the axial flux machine that has the desired operational characteristic(s), such as number of phases, torque, etc. The user determines 274 a radius of the stator based at least in part on the determined number of stator module packs. In particular, the user determines 274 the radius to fit each and every stator module in a desired configuration (e.g., an annularly disposed configuration). In one example, for curved stator module packs, the user calculating an arc angle or arc of the stator modules packs and determines 274 the radius based on the calculated arc angle or arc and the number of stator module packs. In another example, for straight stator module packs, the radius is determined 274 based on an approximated curve defined by the straight module packs. In other embodiments, the user radius of the stator is determined 274 prior to determining 272 the number of stator module packs such that the number of stator module packs is determined 272 based on the determined radius.

The determined number of stator module packs are attached 276 to a stator base selected based at least in part on the determined radius such that the stator module packs fit on the stator base. In some embodiments, the radius of the stator base matches the determined radius. In other embodiments, the radius of the stator base is different from the determined radius. In one example, the radius of the stator base is greater than the determined radius to include space tolerance between the stator module packs. In another example, the radius of the stator base is greater than the determined radius to satisfy one or more operational characteristics desired by the user. In a further example, the stator base is selected from one or more predetermined sizes such that the radius of the stator base exceeds the determined radius.

With respect again to FIGS. 15 and 16, having a separate core 240 and tooth tips 242 for each stator module 210 facilitates reduced manufacturing complexity of modules 210. For example, winding 258 can be wound around teeth 246 prior to installing tooth tips 242. Moreover, tooth tips 242 are configured to reduce noise and cogging torque and improve performance of machine 10 (shown in FIG. 1).

In some embodiments, tooth tips 242 are fabrication from a material or combination of materials that is different from the material(s) used to fabricate core 240. In one example, core 240 is fabricated from laminated steel sheets 241 and tooth tips 242 are fabricated from an SMC material. Using SMC for tooth tips 242 facilitates improved ease of manufacturing for modules 210 while maintaining reasonable manufacturing costs. Moreover, using SMC for tooth tips 242 facilitates improved thermal performance of stator module 210. That is, SMC-based tooth tips 242 dissipate heat at a greater rate than laminated steel, thereby reducing potential thermal issues with modules 210.

Figure 18:
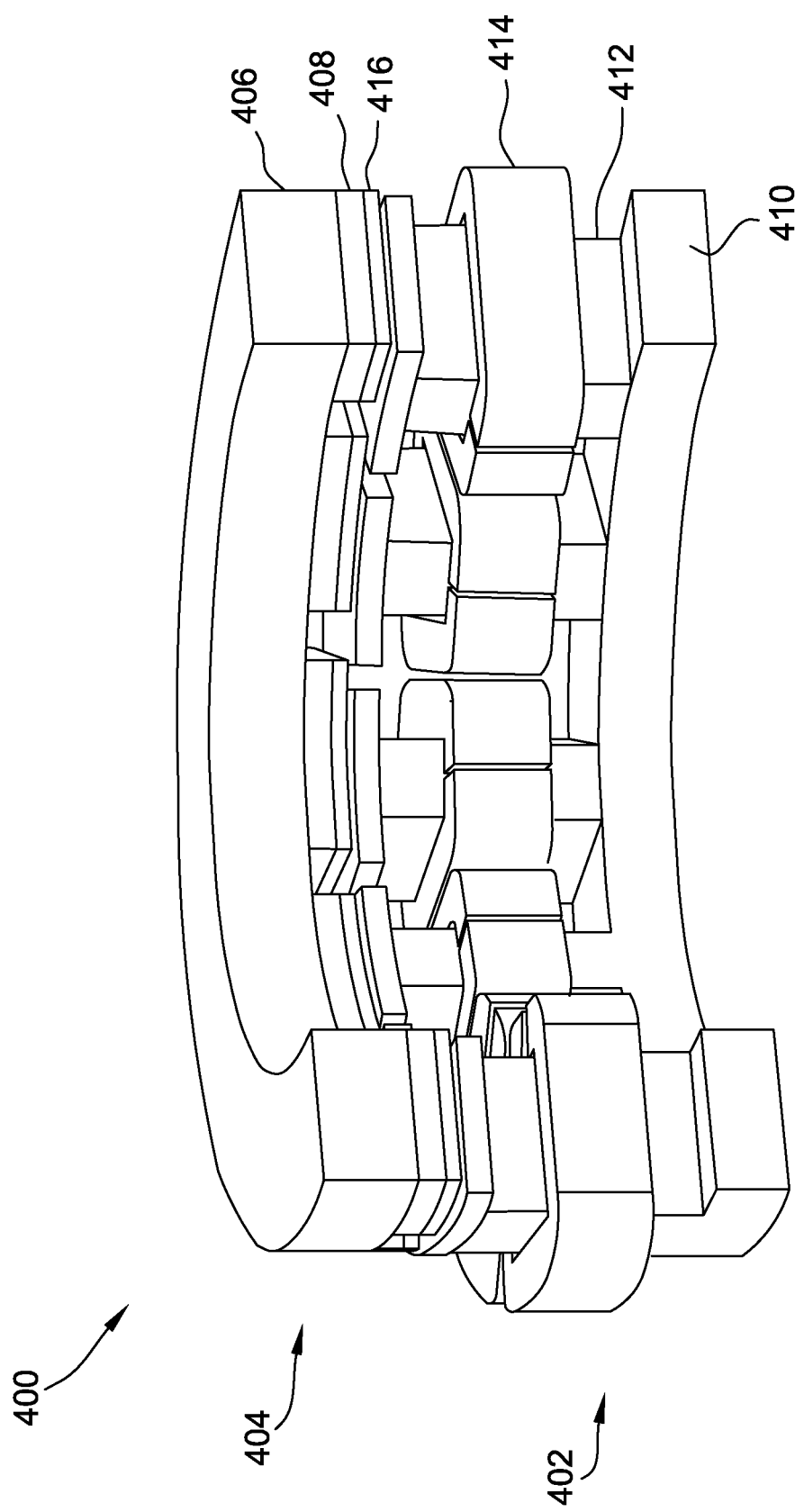
FIG. 18 is a perspective view of an exemplary partial axial flux electric machine.
Figure 19:
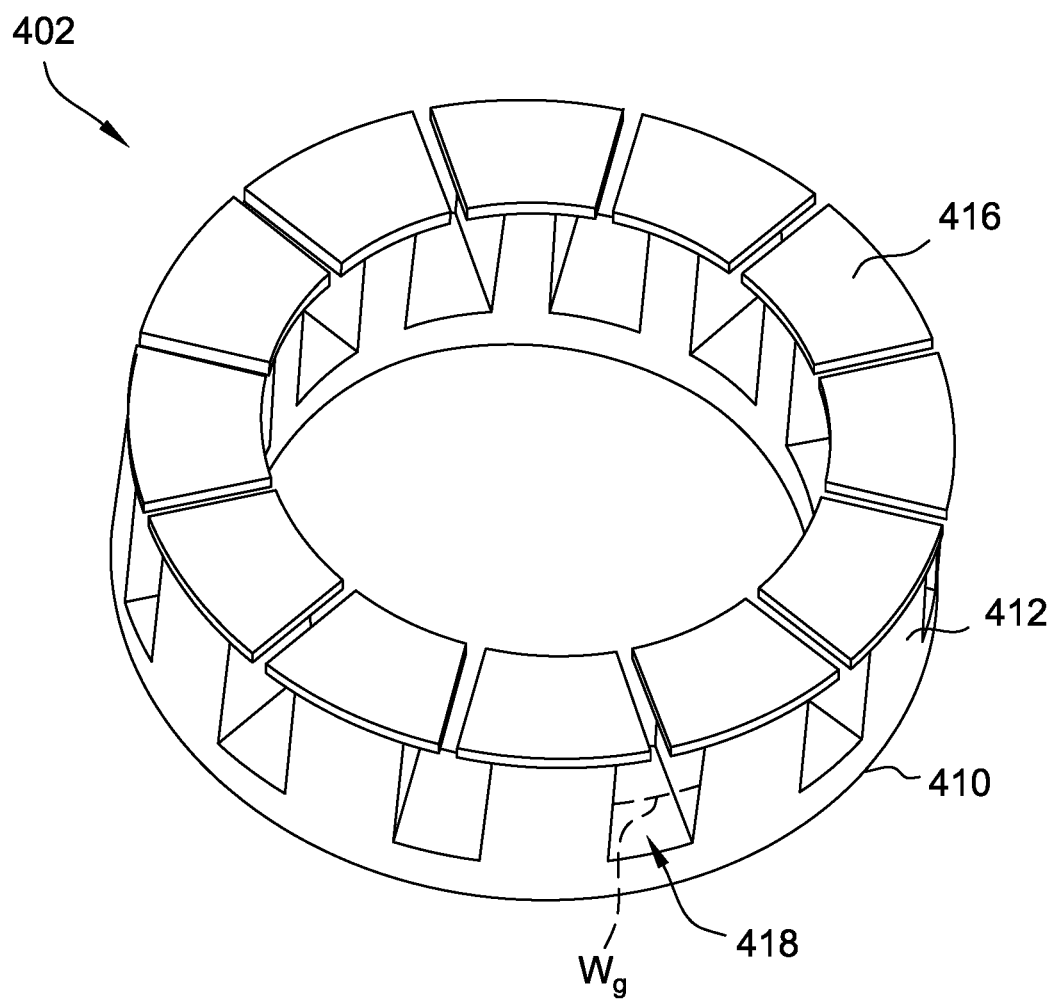
FIG. 19 is a perspective view of an exemplary stator that may be used with the axial flux electric machine shown in FIG. 18.

FIG. 18 is a partial perspective view of an exemplary axial flux electric machine 400 and FIG. 19 is a perspective view of a stator 402 of electric machine 400. In the exemplary embodiment, machine 400 is a non-modular electric machine. In other embodiments, machine 400 may be configured to be modular similar to machine 10 (shown in FIG. 1). Accordingly, the features and components described herein may be applied to machine 10. Machine 400 includes stator 402 and a rotor 404. Rotor 404 includes a rotor back iron 406 and a plurality of magnets 408 annularly disposed around back iron 406.

Stator 402 includes a stator back iron 410, a plurality of teeth 412 that extend towards rotor 404, and a plurality of windings 414 that are disposed on teeth 412. Stator back iron 410 is shown as a single, circular back iron. However, in other embodiments, back iron 410 has a different shape and/or includes a plurality of segments that form back iron 410 collectively. Teeth 412 and magnets 408 are radially aligned with respect to each other. In the exemplary embodiment, stator 402 is fabricated from a first magnetic material, such as laminated steel. Each tooth 412 is securely coupled to a respective tooth tip 416 such that tooth tips 416 are between teeth 412 and magnets 408. In the exemplary embodiment, tooth tips 416 have a substantially planar surface and an arcuate trapezoidal shape. Tooth tips 416 have profiled (e.g., rounded, chamfered, complex, etc.) edges that may be otherwise difficult to manufacture with laminated steel. In other embodiments, tooth tips 416 have a different shape, such as a non-planar shape. In the exemplary embodiment, tooth tips 416 are fabricated from a second material different from the first material, such as SMC.

Tooth tips 416 extend beyond one or more edges of teeth 412 toward an adjacent tooth 412 and tooth tip 416. Adjacent tooth tips 416 define an air gap 417 that is smaller than slots 418 defined between the adjacent tooth tips 416. Slots 418 have a substantially constant $W_g$ between each pair of adjacent teeth 412. Tooth tips 416 are separate from teeth 412 to enable windings 414 to be disposed around teeth 412 with relative ease. That is, windings 414 are inserted within slots 418 to be wound around teeth 412 without needle winding prior to installing tooth tips 416. Tooth tips 416 are coupled to teeth 412 using any suitable means, such as adhesive, fasteners, slots, tabs, and the like. Once coupled to teeth 412, tooth tips 416 define gap 417, which has a width that would require the use of needle winding to install windings 414 after tooth tips 416 are installed.

In some embodiments, a combination of laminated steel and an SMC material may be used to form a stator. Laminated steel includes a stack of thin, flat sheets of steel that are laminated together to form a three-dimensional object, such as a stator tooth. Typically, the laminated object is a stack of identical stampings that have a fixed cross section in one dimension. This fixed cross section is linearly "extruded" to form a final shape with a constant cross section, thereby limiting the shape of the object. Further, the magnetic properties of laminated objects are distinctly anisotropic. The laminated material carries alternating magnetic flux relatively efficiently in two of the three dimensions. In particular, the two dimensions defined by the plane of lamination efficiently carry. While the laminated material can carry alternating flux in the third dimension, this results in relatively high losses due to eddy currents circulating in the plane of lamination. Laminated steel is typically a low-cost magnetic material used in electric machines. SMC is a relatively expensive magnetic material that can be molded into a variety of three-dimensional shapes. SMC material is magnetically isotropic such that objects made from SMC carry magnetic flux in any direction inside the 3D object, with substantially identical, relatively low losses in all directions. SMC has a lower magnetic performance in comparison to laminated steel, but laminated steel may require time-consuming manufacturing and may include small imperfections between the laminated sheets that affect the magnetic performance of the steel. Electric machine components formed from SMC are fabricated with relatively simple manufacturing processes and do not have the same imperfection issues as laminated steel. Due to the cost and performance difference of laminated steel and SMC, a combination of the two materials may be used to form a stator.

FIGS. 20-27 are perspective views of exemplary stator configurations for use in axial flux electric machines (e.g., machine 10 shown in FIG. 1). In particular, each stator includes a plurality of magnetic laminated tooth segments 510, a plurality of magnetic moldable tooth segments 512, and a plurality of windings 514. In the exemplary embodiment, each configuration includes an equal number of laminated tooth segments 510 and moldable tooth segments 512. Alternatively, the stator configurations may include an unequal number of tooth segments 510 and 512. Laminated tooth segments 510 and moldable tooth segments 512 have different shapes. In the exemplary embodiment, the different shapes approximate a solid, thick-walled cylinder when the parts are assembled. In each stator configuration, laminated tooth segment segments 510 and moldable tooth segments 512 are interleaved such that each laminated tooth segment 510 is between two moldable tooth segments 512 and each moldable tooth segment 512 is between two laminated tooth segment segments 510. Each winding 514 is disposed on a respective moldable tooth segment 512.

It is to be understood that other materials beyond laminated steel (including non-laminated materials having suitable characteristics to function as described herein) may be used to fabricate laminated tooth segment segments 510. Similarly, moldable tooth segments 512 may be fabricated a different material other than SMC, even non-composite material. Moreover, the stator configurations shown in FIGS. 20-27 are for illustrative purposes only, and are not intended to limit the stator configurations described herein.

Figure 20:
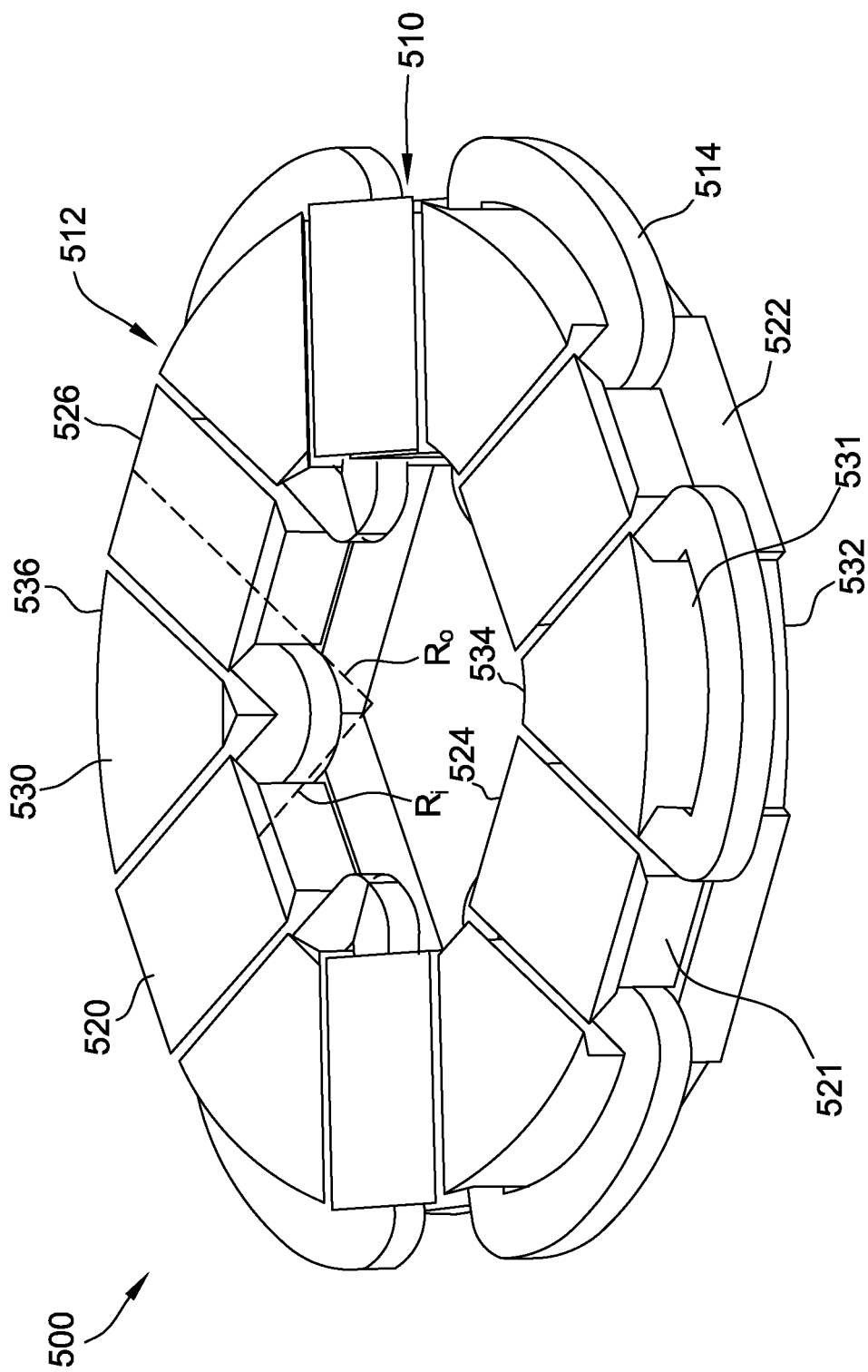
FIG. 20 is a perspective view of an exemplary twelve slot, 0.55 split ratio stator configuration with alternating tooth segments that may be used with the machine shown in FIG. 1.

FIG. 20 is a perspective view of an exemplary stator configuration 500. The stator configurations of FIGS. 21-27 are similar to stator configuration 500, and therefore include similar components. Stator configuration 500 has an inner radius $R_i$ and an outer radius $R_o$. Laminated tooth segment segments 510 include a tooth tip 520, a tooth section 521, and a yoke section 522. Tooth tip 520 is coupled to tooth section 521 at a first end and includes an inner edge 524 and an outer edge 526. Tooth section 521 extends from yoke section 522. In the exemplary embodiment, tooth tip 520, tooth section 521, and yoke section 522 are substantially the same at inner edge 524 and outer edge 526 because the laminated sheets that form laminated tooth segment segments 510 are substantially identical to each other.

Moldable tooth segments 512 include a tooth tip 530, a tooth section 531, and a yoke section 532. Tooth tips 530 are coupled to a first end of tooth section 531 and include an inner edge 534 and an outer edge 536. Unlike laminated tooth segment segments 510, tooth tip 530, tooth section 531, and yoke section 532 of moldable tooth segments 512 are substantially different at inner edge 534 and outer edge 536. In particular, moldable tooth segments 512 are smaller at inner edge 534 in comparison to outer edge 536. Using SMC to fabricate moldable tooth segments 512 facilitates non-uniform three-dimensional shapes, such as those shown in FIGS. 20-27. Laminated tooth segments 510 and moldable tooth segments 512 are coupled together at a second end opposite the first ends coupled to tooth tips 520 and 530. In the exemplary embodiment, windings 514 are disposed on moldable tooth segments 512 and are positioned between tooth sections 521 and yoke section 531 of adjacent laminated tooth segment segments 510 and moldable tooth segments 512, respectively.

In the exemplary embodiment, as flux traverses from the top of one tooth segment down within stator configuration 500, the flux turns in either a clockwise or an anticlockwise direction and then comes up via an adjacent tooth segment. The flux will spend some distance in laminated steel (i.e., laminated tooth segments 510), and some in SMC (i.e., moldable tooth segments 512). In an axial flux electric machine, there is always at least some movement of the flux path in a "radial" direction. The differences in the magnetic properties of laminated steel, which is anisotropic, and SMC, which is isotropic, mean that for a substantially "minimum energy" solution for the actual position of each path, the flux path will travel close to a straight line in the laminated steel due to the relatively low permeability of flux moving perpendicularly to the lamination direction, and nearly all of the radial movement of the flux path will take place in the SMC.

Figure 21:
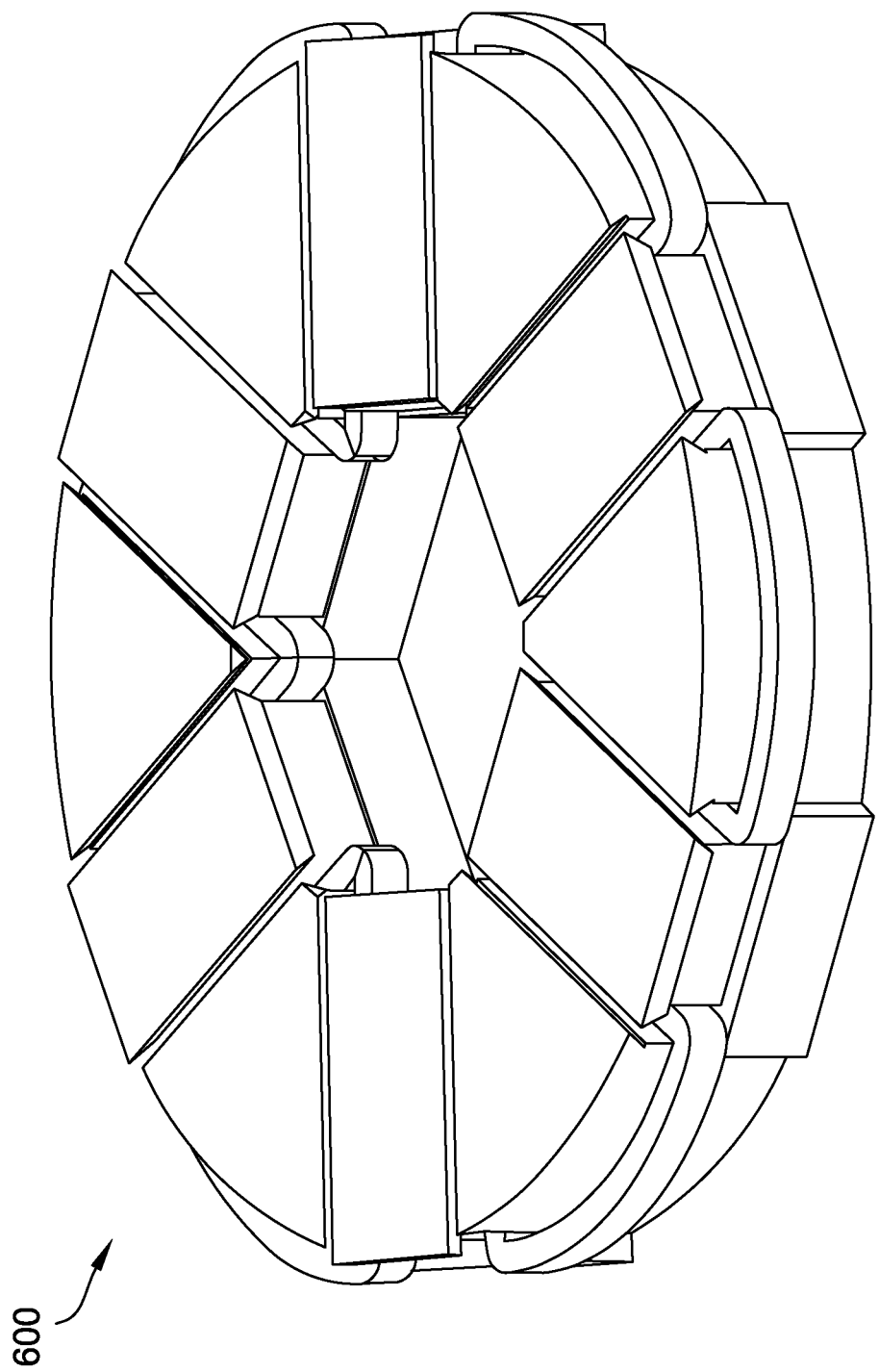
FIG. 21 is a perspective view of an exemplary twelve slot, 0.45 split ratio stator configuration with alternating tooth segments that may be used with the machine shown in FIG. 1.
Figure 22:
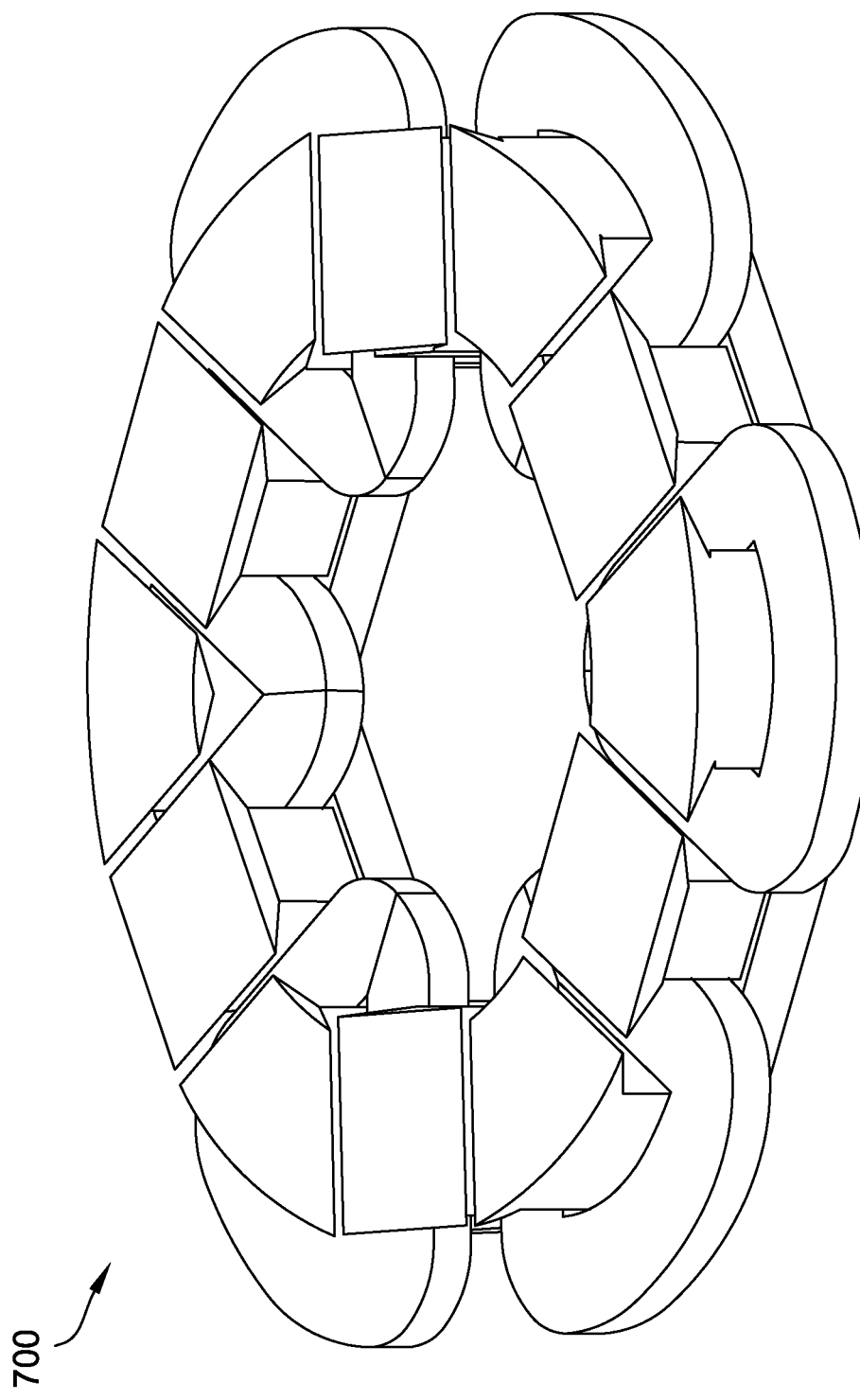
FIG. 22 is a perspective view of an exemplary twelve slot, 0.65 split ratio stator configuration with alternating tooth segments that may be used with the machine shown in FIG. 1.
Figure 23:
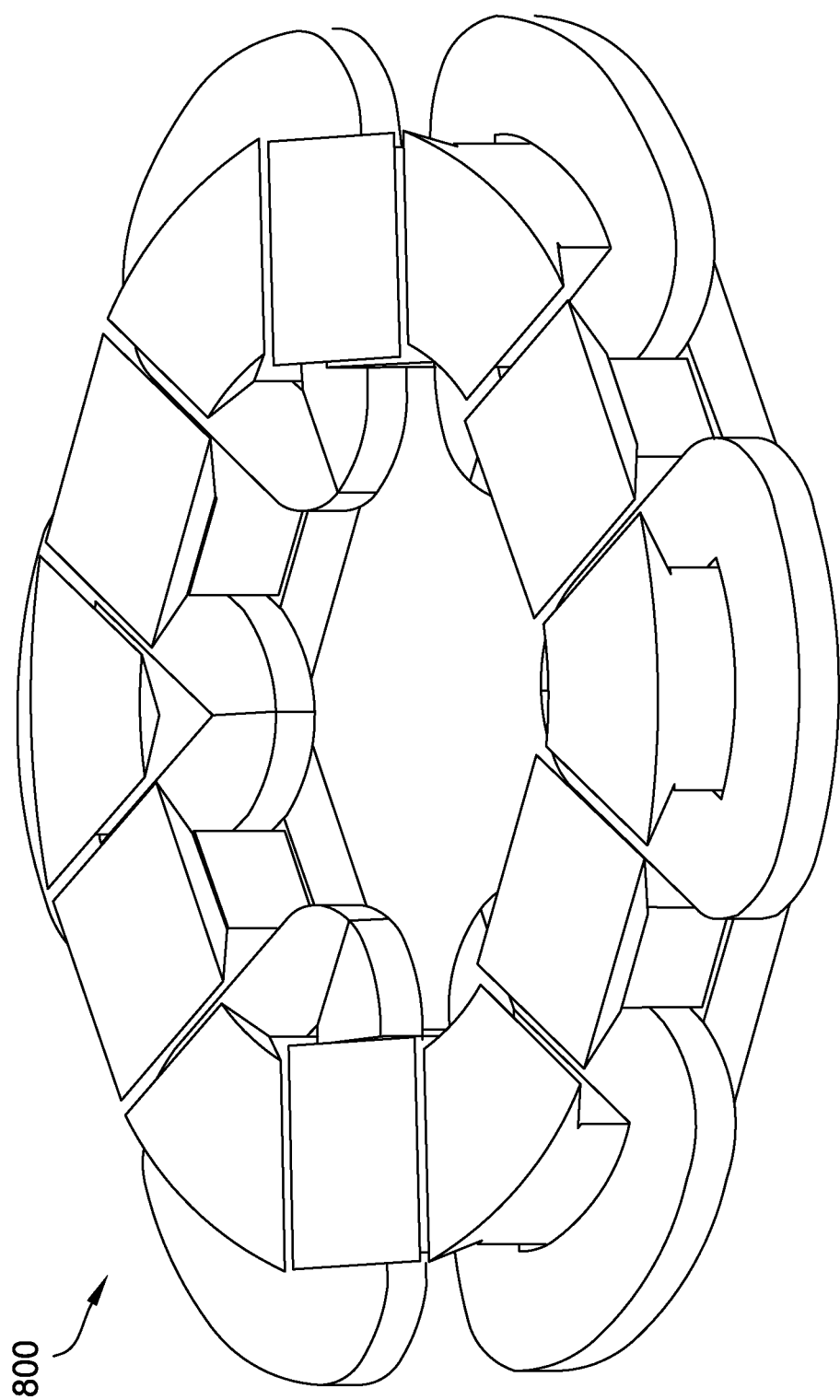
FIG. 23 is a perspective view of an exemplary twelve slot, 0.75 split ratio stator configuration with alternating tooth segments that may be used with the machine shown in FIG. 1.
Figure 24:
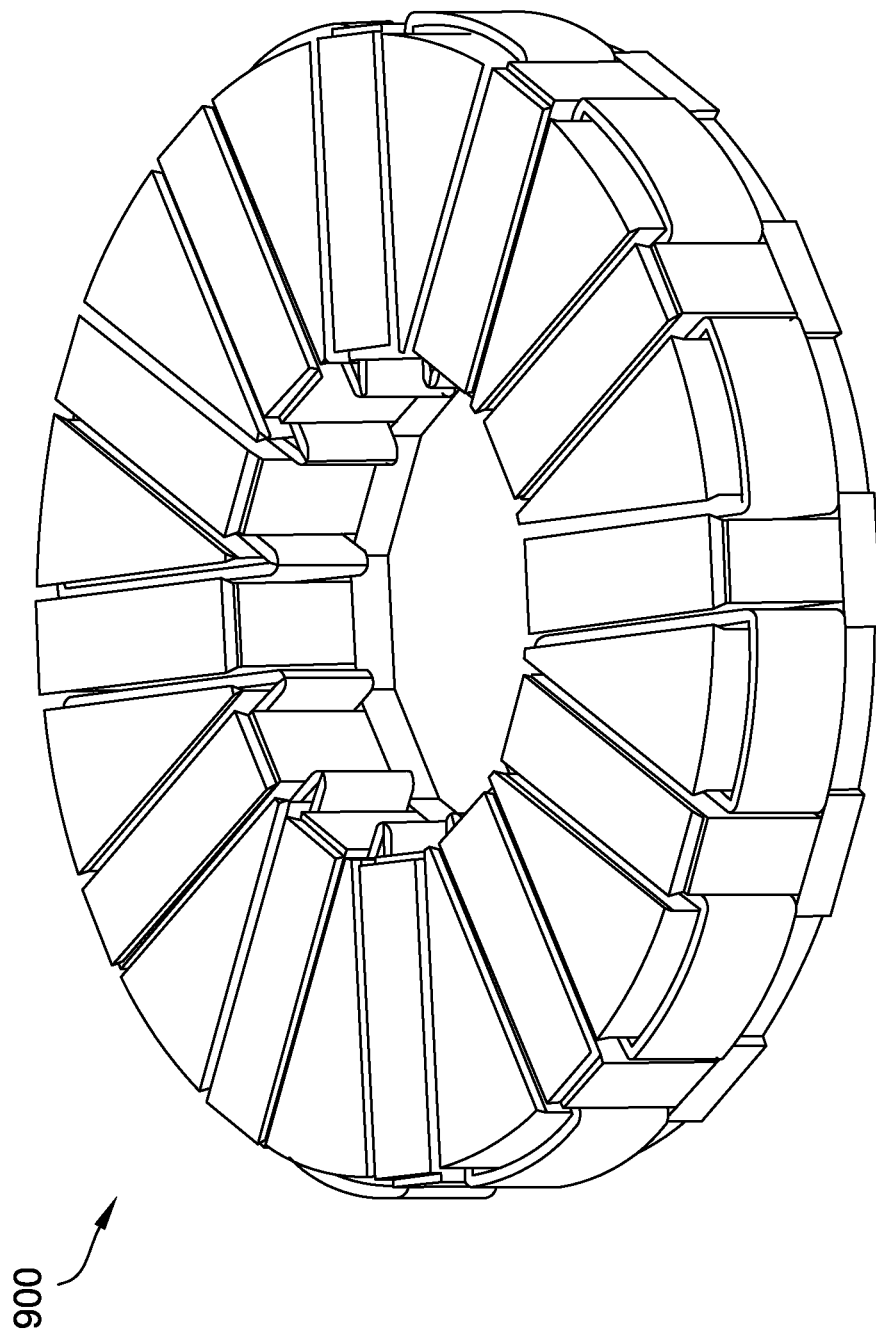
FIG. 24 is a perspective view of an exemplary twenty-four slot, 0.45 split ratio stator configuration with alternating tooth segments that may be used with the machine shown in FIG. 1.
Figure 25:
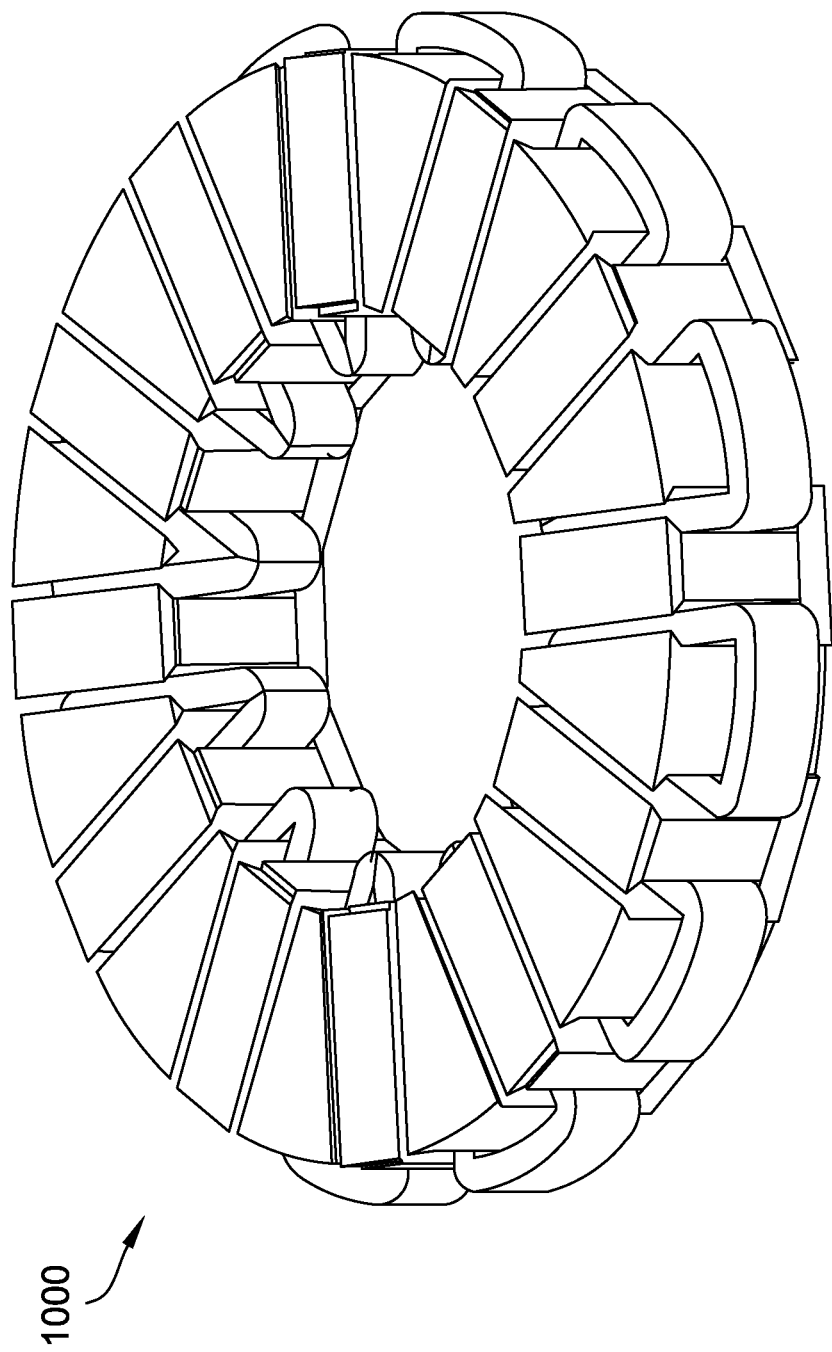
FIG. 25 is a perspective view of an exemplary twenty-four slot, 0.55 split ratio stator configuration with alternating tooth segments that may be used with the machine shown in FIG. 1.
Figure 26:
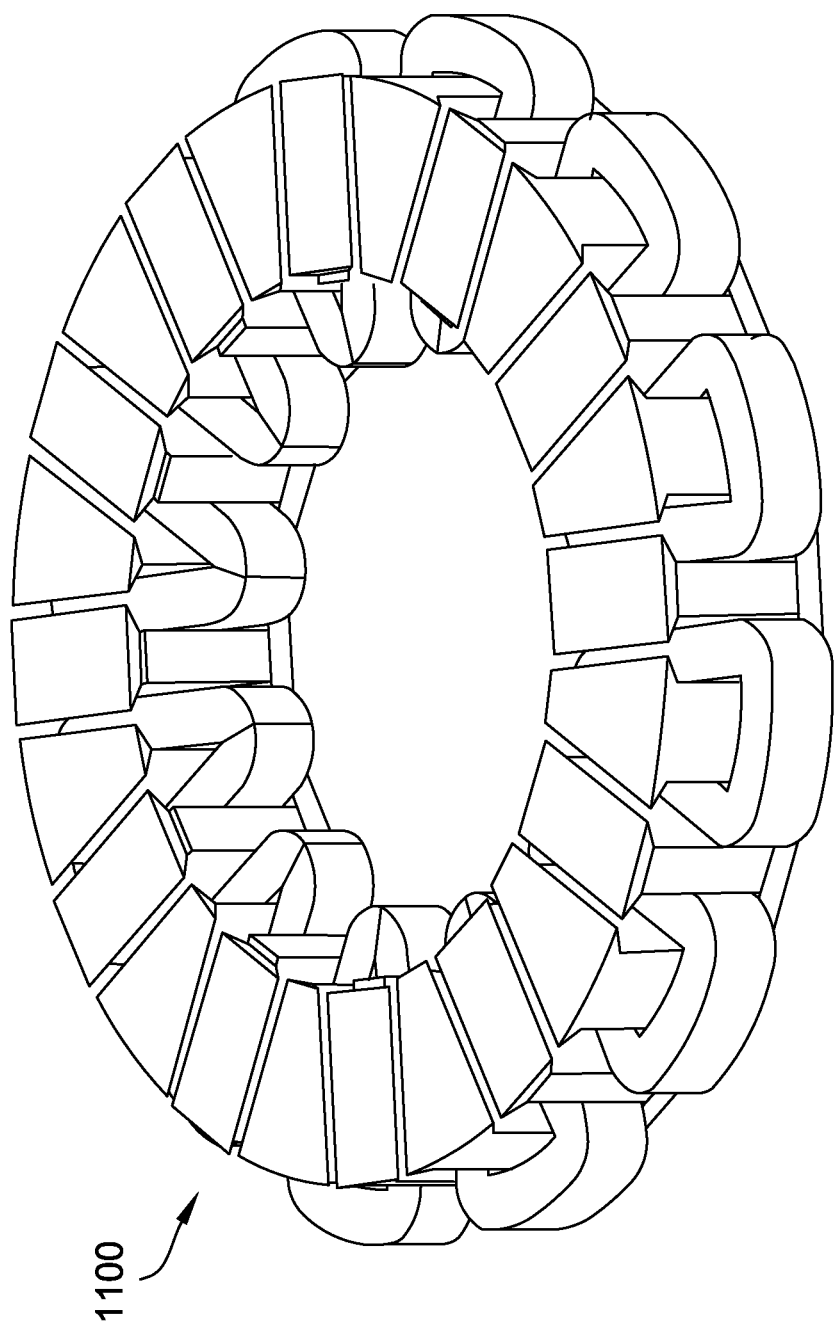
FIG. 26 is a perspective view of an exemplary twenty-four slot, 0.65 split ratio stator configuration with alternating tooth segments that may be used with the machine shown in FIG. 1.
Figure 27:
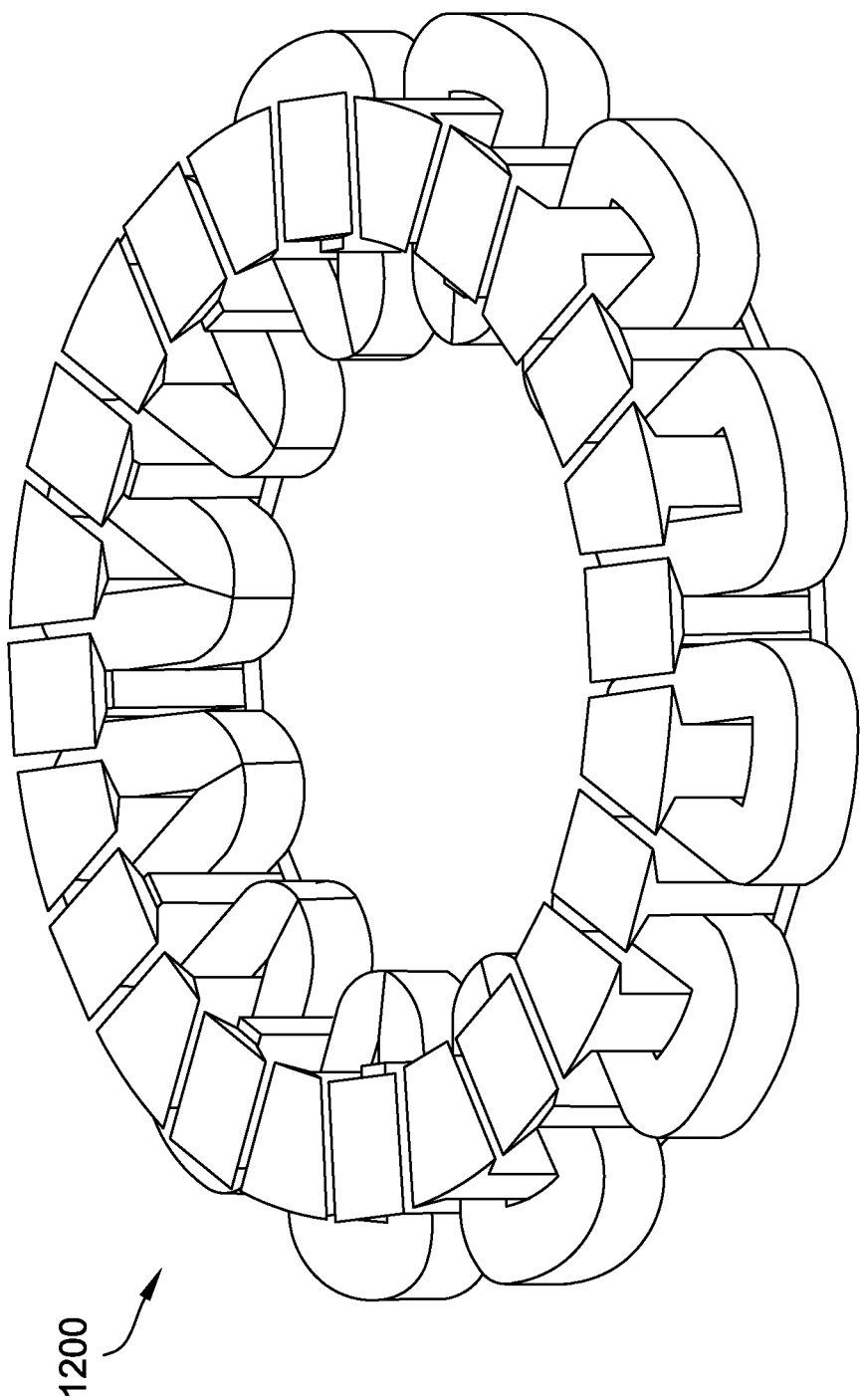
FIG. 27 is a perspective view of an exemplary twenty-four slot, 0.75 split ratio stator configuration with alternating tooth segments that may be used with the machine shown in FIG. 1.

Stator configuration 500 is a twelve slot stator configuration with a split ratio (i.e., the ratio between the diameter of inner edge 534 and the diameter of outer edge 536) of 0.55. FIGS. 21-23 are perspective views of other twelve slot stator configurations 600, 700, and 800. Unlike stator configuration 500, stator configuration 600 has a split ratio of 0.45, configuration 700 has a split ratio of 0.65, and configuration 800 has a split ratio of 0.75. FIGS. 24-27 are perspective views of stator configurations 900, 1000, 1100, and 1200. Stator configurations 900, 1000, 1100, and 1200 are twenty-four slot stator configurations with split ratios of 0.45, 055, 0.65, and 0.75, respectively.

The foregoing systems and methods facilitate various improvements to axial flux electric machines. In particular, the foregoing systems and methods facilitate manufacturing improvements, cost improvements, maintenance improvements, and performance improvements to axial flux machines. For example, the modular rotor modules and stator modules packs facilitate improved design and maintenance flexibility for axial flux electric machines. The modular rotors and stators facilitate high volume production of the modular components, which may result in reduced manufacturing costs for each component. Using a combination of laminated steel and SMC materials either as separate teeth and tooth tips or as alternating tooth segments facilitate design flexibility and improved performance of the electric machines without substantially increasing the cost of the electric machine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor module for an axial flux electric machine, said rotor module comprising:
    a back iron segment configured for attachment to a rotor base, said back iron segment having a length less than a circumference of said rotor base, said back iron segment having a tab;
    a plurality of permanent magnets attached to said back iron segment, each permanent magnet of said plurality of permanent magnets having a face surface, wherein said each permanent magnet has an opposite magnetic pole orientation from each adjacent permanent magnet of said plurality of permanent magnets attached to said back iron segment; and
    a magnet retainer attached to said back iron segment, said magnet retainer including a plurality of slots aligned with said plurality of permanent magnets such that said face surfaces of said plurality of permanent magnets are not covered by said magnet retainer, said plurality of slots configured to receive said plurality of permanent magnets and position said plurality of permanent magnets on said back iron segment, said magnet retainer having a length less than the circumference of said rotor base, said magnet retainer defining an opening configured to receive said tab of an adjacent back iron segment.

2. The rotor module in accordance with claim 1, wherein said plurality of permanent magnets are positioned adjacent each other in a substantially straight line on said back iron segment, wherein said back iron segment has a substantially straight length.

3. The rotor module in accordance with claim 1, wherein said plurality of permanent magnets are positioned adjacent each other to define an arc, wherein said back iron segment is curved along the arc.

4. The rotor module in accordance with claim 3, wherein the arc is defined by a radius of said rotor base.

5. The rotor module in accordance with claim 3, wherein said plurality of permanent magnets have a trapezoidal shape.

6. The rotor module in accordance with claim 1, wherein said plurality of permanent magnets comprises an even number of permanent magnets.

7. The rotor module in accordance with claim 1, wherein said back iron segment comprises at least one of laminated steel, a soft magnetic composite (SMC) material, and ferromagnetic steel.

8. The rotor module of claim 1, wherein said magnet retainer is further configured to secure said plurality of permanent magnets to the back iron segment.

9. A rotor for an axial flux electric machine, said rotor comprising:

a rotor base having a face surface and a circumference around said face surface; and
at least one rotor module attached to said rotor base, said at least one rotor module comprising:
    a back iron segment attached to said face surface of said rotor base, said back iron segment having a length less than a circumference of said rotor base;
    a plurality of permanent magnets attached to said back iron segment, each permanent magnet of said plurality of permanent magnets having a face surface, wherein said each permanent magnet has an opposite magnetic pole from each adjacent permanent magnet of said plurality of permanent magnets attached to said back iron segment; and
    a magnet retainer attached directly to said back iron segment and said rotor base, said magnet retainer including a plurality of slots aligned with said plurality of permanent magnets such that said face surfaces of said plurality of permanent magnets are not covered by said magnet retainer, said plurality of slots configured to receive said plurality of permanent magnets and position said plurality of permanent magnets on said back iron segment, said magnet retainer having a length less than the circumference of said rotor base.

10. The rotor in accordance with claim 9, wherein said plurality of permanent magnets are positioned adjacent to each other in a substantially straight line on said back iron segment, wherein said back iron segment has a substantially straight length.

11. The rotor in accordance with claim 9, wherein said plurality of permanent magnets are positioned adjacent to each other to define an arc, wherein said back iron segment is curved along the arc.

12. The rotor in accordance with claim 11, wherein the arc is substantially the same as an arc defined by an outer edge of said rotor base.

13. The rotor in accordance with claim 9, wherein said at least one rotor module comprises a plurality of circumferentially arranged modules.

14. The rotor in accordance with claim 13, wherein said plurality of rotor modules are curved and aligned with an outer edge of said rotor base.

15. The rotor in accordance with claim 13, wherein each rotor module of said plurality of rotor modules has a substantially straight length, wherein said plurality of rotor modules are angled relative to each other to approximate an arc defined by an outer edge of said rotor base.

16. The rotor in accordance with claim 9, wherein said rotor base comprises a nonmagnetic material.

17. The rotor in accordance with claim 16, wherein said nonmagnetic material includes at least one of aluminum, plastic, and stainless steel.

18. An axial flux electric machine comprising:
    a stator; and
    a rotor positioned adjacent said stator, said rotor comprising:
        a rotor base having a face surface and a circumference around said face surface; and
        at least one rotor module attached to said rotor base, said at least one rotor module comprising:
            a back iron segment attached to said face surface of said rotor base, said back iron segment having a length less than a circumference of said rotor base;
            a plurality of permanent magnets attached to said back iron segment, each permanent magnet of said plurality of permanent magnets having a face surface, wherein said each permanent magnet has an opposite magnetic pole from each adjacent permanent magnet of said plurality of permanent magnets attached to said back iron segment; and a magnet retainer attached directly to said back iron segment and said rotor base, said magnet retainer including a plurality of slots aligned with said plurality of permanent magnets such that said face surfaces of said plurality of permanent magnets are not covered by said magnet retainer, said plurality of slots configured to receive said plurality of permanent magnets and position said plurality of permanent magnets on said back iron segment, said magnet retainer having a length less than the circumference of said rotor base.

19. The axial flux electric machine in accordance with claim 18, wherein said stator is a modular stator having a plurality of stator modules, each stator module comprising a core having at least one winding disposed thereon.

20. The axial flux electric machine in accordance with claim 19, wherein a number of said plurality of permanent magnets is equal to a number of windings of said plurality of stator modules.

* * * * *